United States Patent [19]

Weber

[11] 4,107,770

[45] Aug. 15, 1978

[54] MODULAR CHANDELIER WITH PLUG-IN ARMS

[75] Inventor: Frank K. Weber, Encino, Calif.

[73] Assignee: Gene W. Arant, Los Angeles, Calif.; a part interest

[21] Appl. No.: 562,337

[22] Filed: Mar. 27, 1975

Related U.S. Application Data

[63] Continuation-in-part of Ser. No. 459,906, Apr. 11, 1974, abandoned.

[51] Int. Cl.² .......... H02G 3/20

[52] U.S. Cl. .......... 362/405; 362/249

[58] Field of Search .......... 240/76, 78 R, 78 F; 339/20, 135, 193, 194, 198

[56] References Cited

U.S. PATENT DOCUMENTS

| | | | |
|---|---|---|---|
| 1,035,061 | 8/1912 | Trood | 240/78 |
| 1,045,273 | 11/1912 | Fisher | 240/78 F |
| 1,059,742 | 4/1913 | Lumley | 240/78 F |
| 1,503,306 | 7/1924 | Dominick | 339/20 |
| 1,668,772 | 5/1928 | Kestell | 240/78 F |
| 3,387,129 | 6/1968 | Weber et al. | 240/78 R |
| 3,651,443 | 3/1972 | Quilez | 339/20 |
| 3,735,123 | 5/1973 | Porter | 240/78 R |

FOREIGN PATENT DOCUMENTS

| | | | |
|---|---|---|---|
| 708,943 | 5/1931 | France | 240/78 F |
| 913,578 | 6/1946 | France | 240/78 F |
| 133,583 | 5/1933 | Fed. Rep. of Germany | 240/78 F |
| 295,207 | 11/1916 | Fed. Rep. of Germany | 240/78 F |

*Primary Examiner*—L. T. Hix
*Assistant Examiner*—Alan Mathews

[57] ABSTRACT

A modular chandelier includes a rigid central frame and a plurality of radially disposed arms each of which is easily detachable from the frame. Mating electrical contacts are associated with the mechanical attachment means for each arm, so that the arm is electrically connected at the same time it is mechanically attached to the central frame, or electrically disconnected when it is detached.

47 Claims, 36 Drawing Figures

FIG. 5.
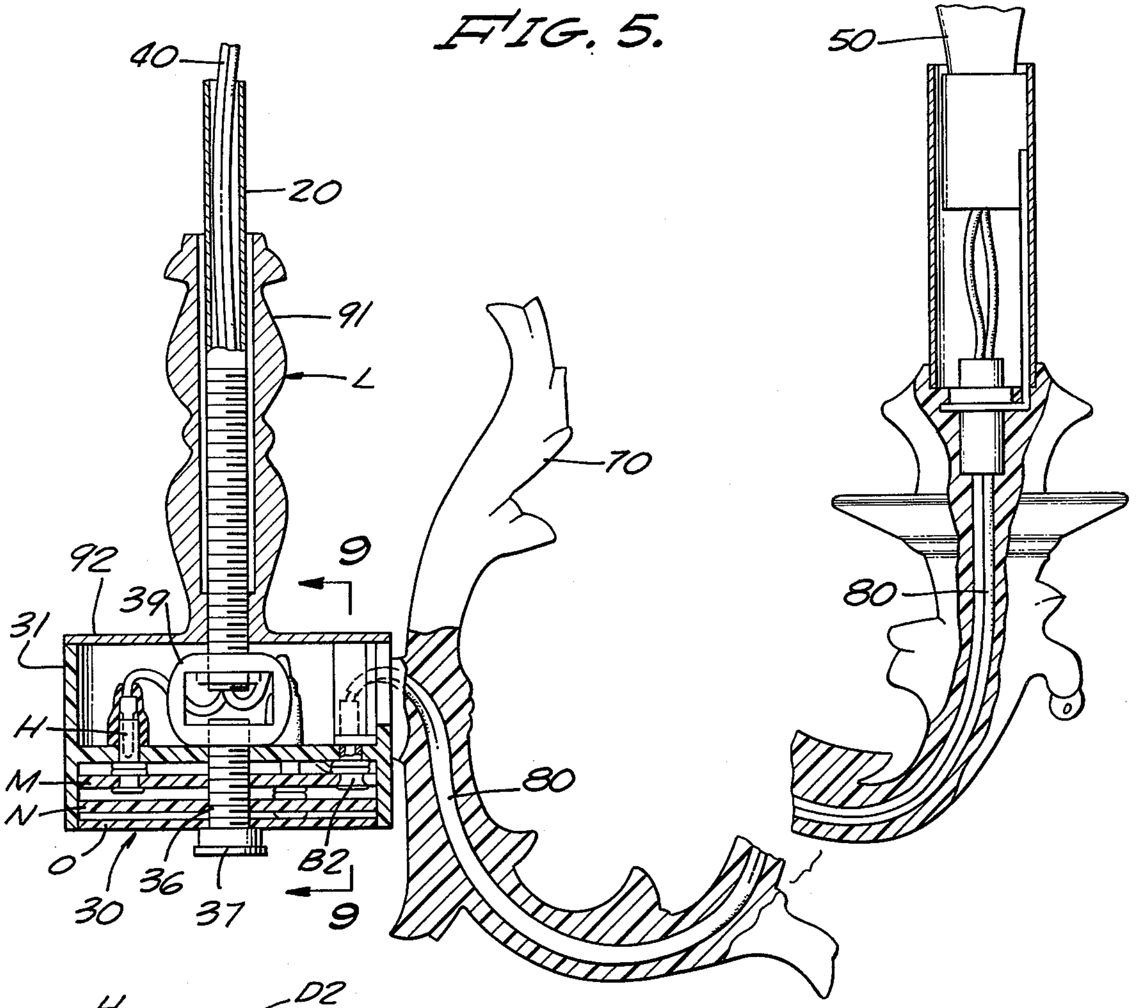
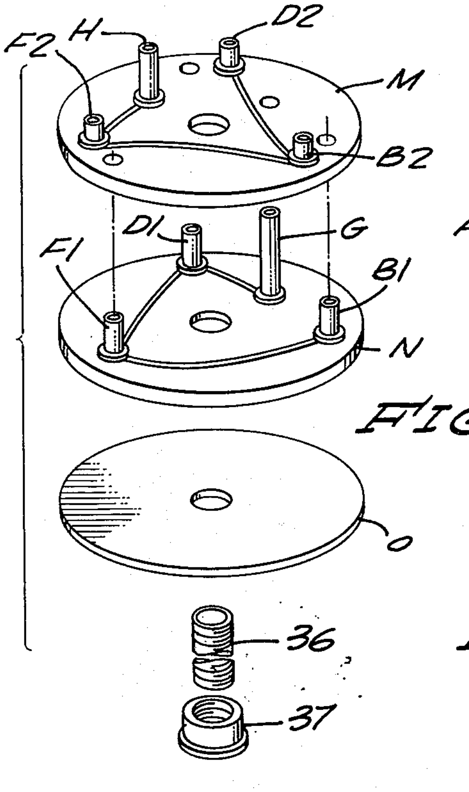
FIG. 6.
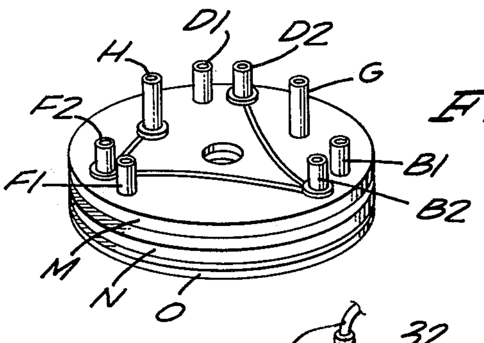
FIG. 7.
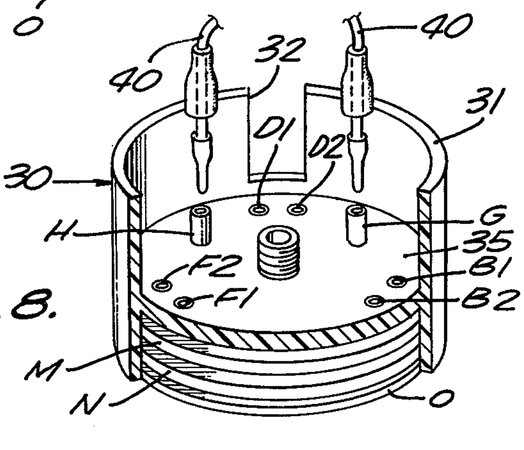
FIG. 8.

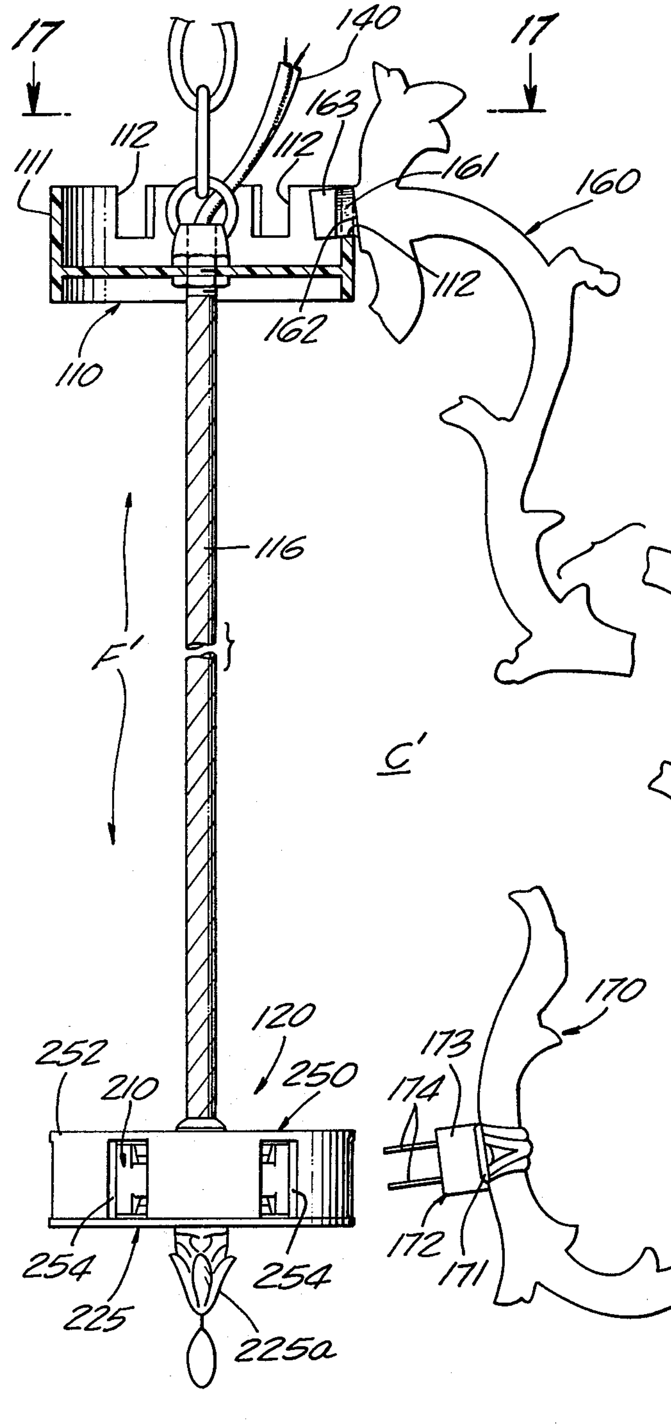
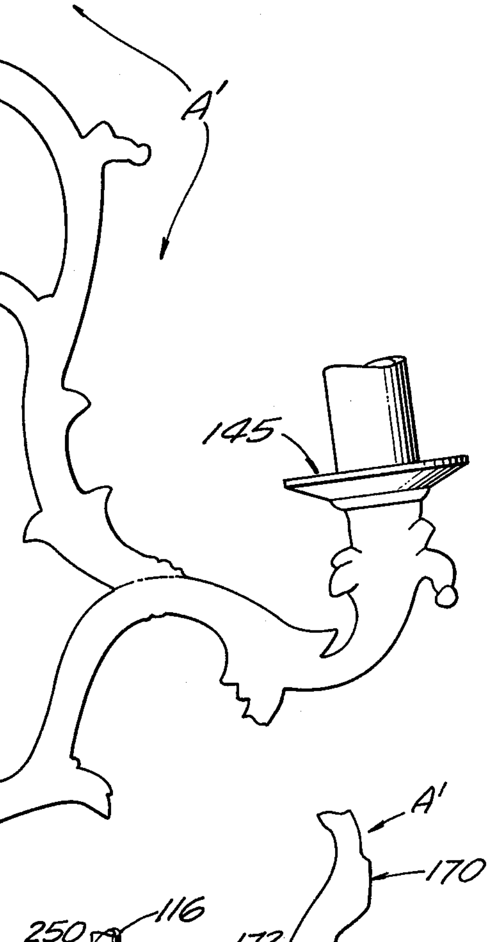
FIG. 16.
FIG. 17.
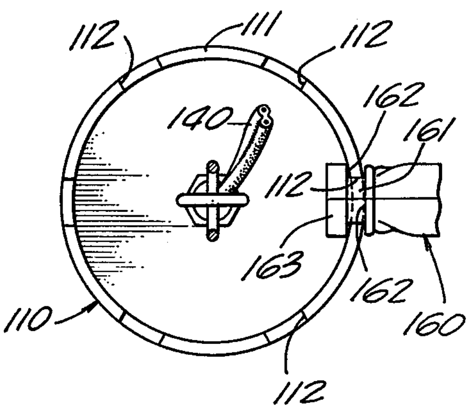
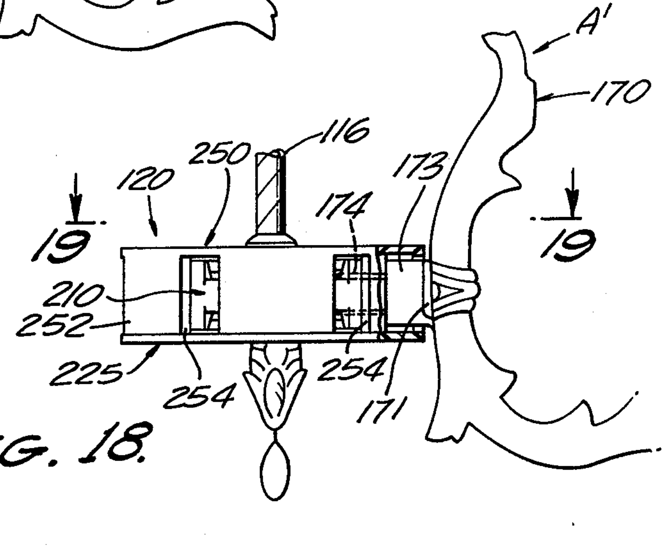
FIG. 18.

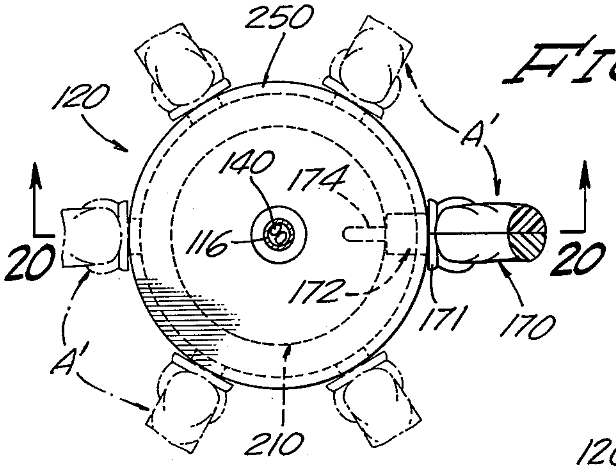
FIG. 19.
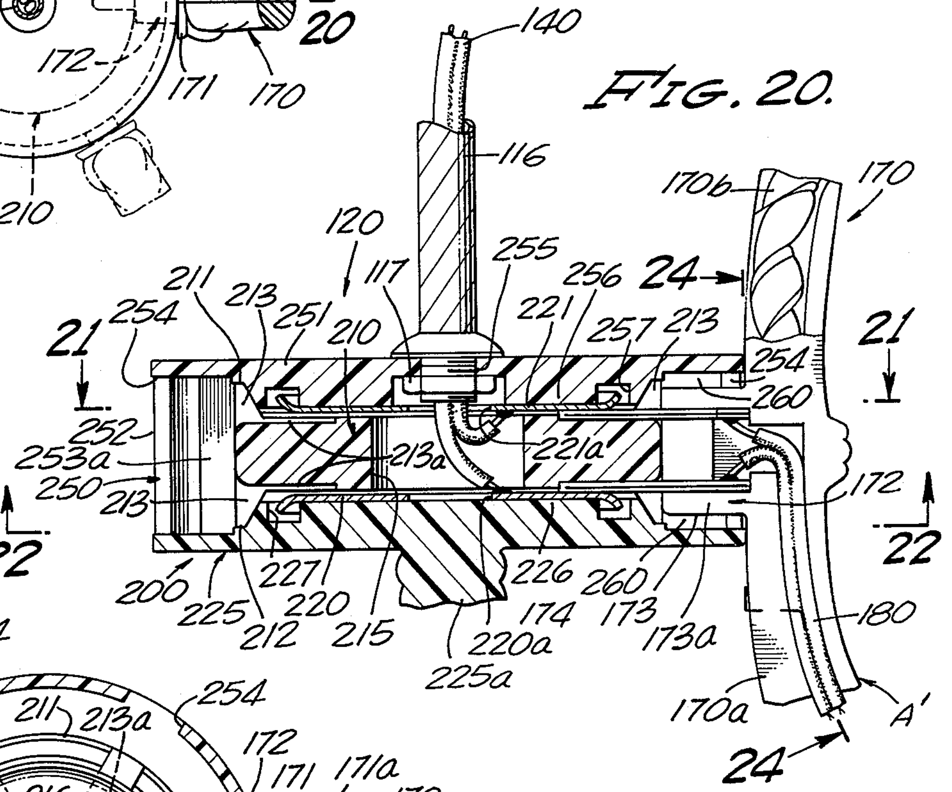
FIG. 20.
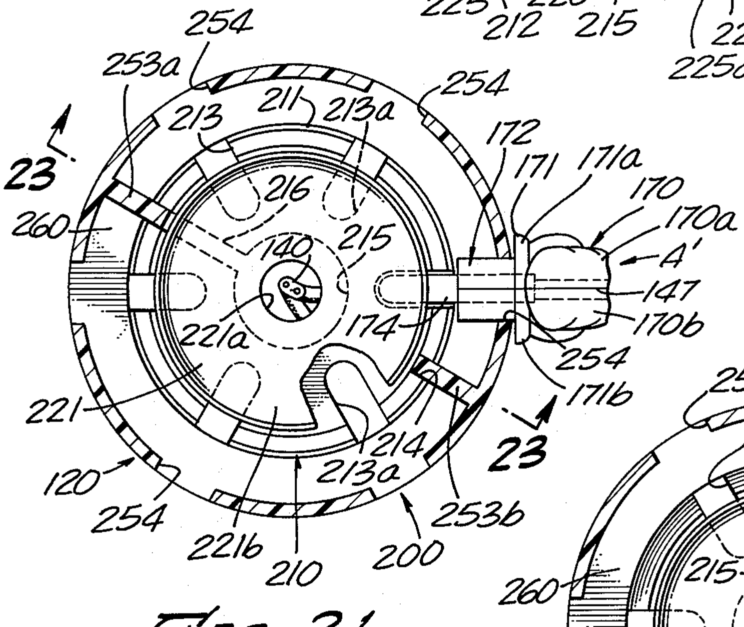
FIG. 21.
FIG. 22.
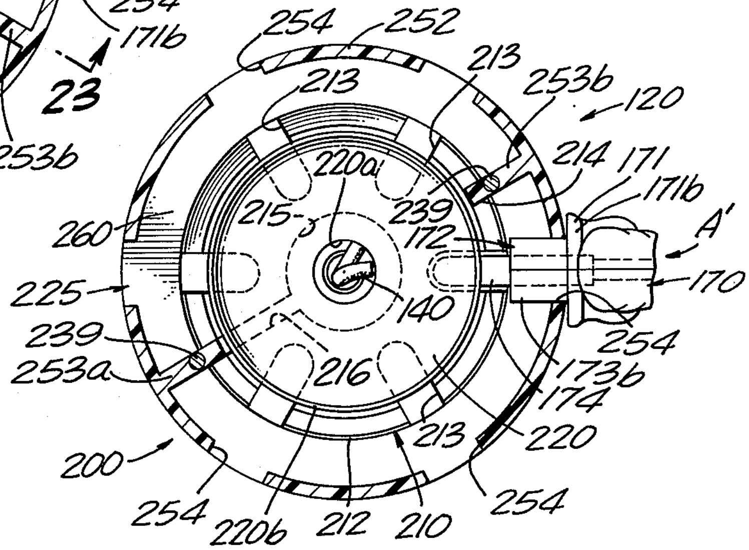

FIG. 28.
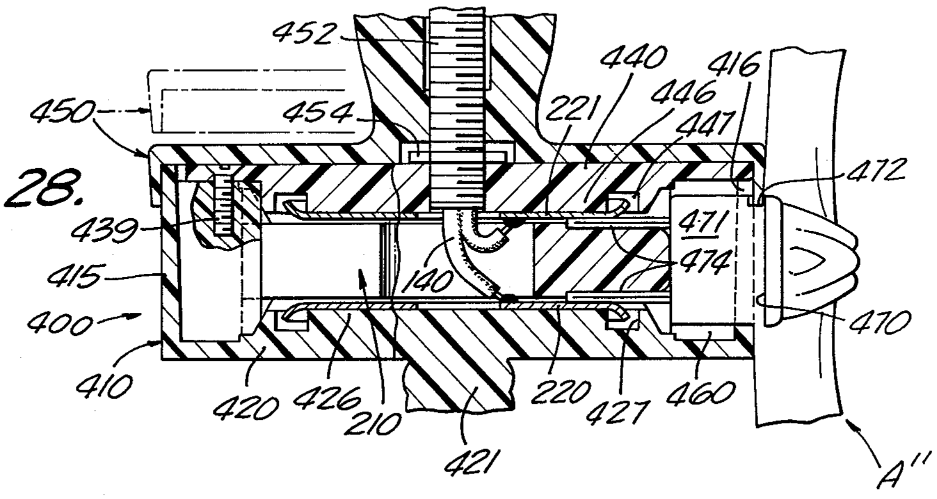
FIG. 29.
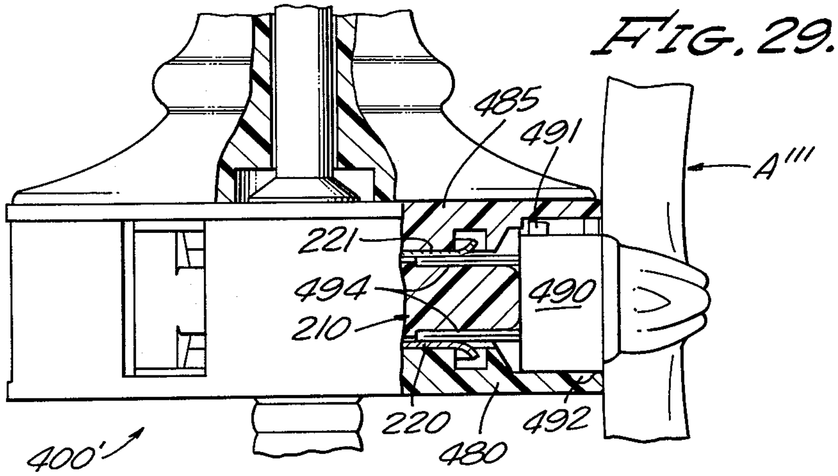
FIG. 30.
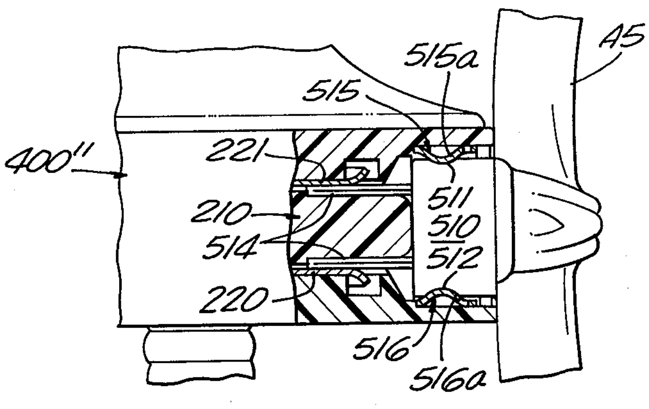
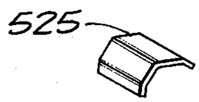
FIG. 33
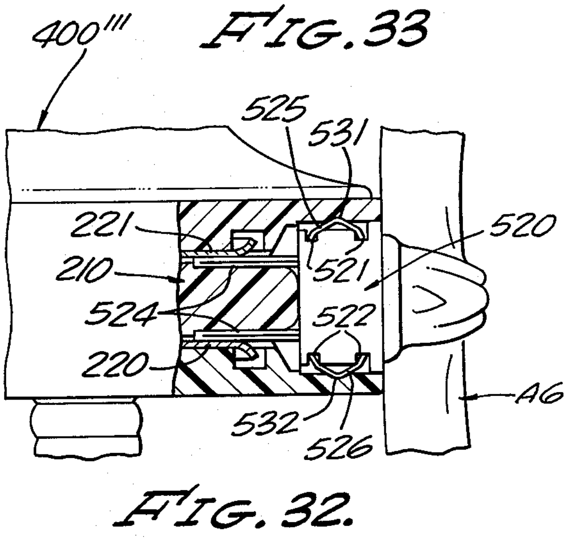
FIG. 32.
FIG. 31.
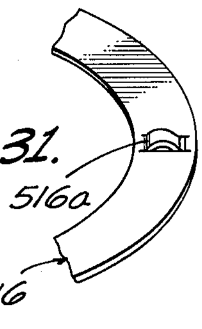

MODULAR CHANDELIER WITH PLUG-IN ARMS

RELATED APPLICATIONS

This application is a continuation-in-part of my prior copending application Ser. No. 459,906,filed Apr. 11, 1974 and subsequently abandoned.

PRIOR ART

Applicable prior art includes the Edison U.S. Pat. No. 251,553 (1881); the Trood U.S. Pat. No. 1,035,061 (1912); German Pat. No. 133,583 (1933); British Pat. No. 894,373 (1961); and the Oshima et al U.S. Pat. No. 3,562,512 (1971).

Edison shows a knockdown chandelier having arms which are screwed into the central frame. Each arm is provided with ring and tap contacts. The Trood patent discloses a similar structure which also has a pair of concentric metal dishes contained within the chandelier central body. Each arm, as it is screwed into the central body, extends through openings in both of the dishes, with the ring contacting the outer dish and the tap contacting the inner dish.

German Pat. No. 133,583 discloses a modular chandelier having a particular type of plug-in arm. A pair of U-shaped contacts on the arm slide downward to engage a pair of L-shaped contacts housed within a conventionally wired central body.

British Pat. No. 894,373 discloses a basket-type chandelier in which the arms are hooked to the central body, and conventional electrical wiring extends from the arms into the central body.

The Oshima et al U.S. Pat. No. 3,562,512 (1971) discloses a ceiling fixture with a pair of vertical metal prongs with turned-over upper ends which are rotatably attached to provide both mechanical support for the unit and electrical connection to the energy source.

BACKGROUND OF THE INVENTION

Numerous modes of constructing chandeliers have been devised over a period of many decades. Functional operation, decorative appearance, and manufacturing cost are considerations that are involved in every chandelier design.

The present invention, however, is directed toward an aspect of the problem which has frequently been neglected. This is the handling problem — transportation and storage of the product before it is sold, assembly of the product when it is installed, and repair or cleaning after it is in use.

The present invention is also directed toward achieving safety, and particularly, by providing mechanisms which fully comply with regulations and standards of Underwriters Laboratories.

Some attention it is true, has been given to the transportation and storage of chandeliers. Chandeliers have been packaged in disassembled form in order to minimize the cost of storage, transportation, and handling. But installation has continued to require a great deal of expensive hand labor by an electrician. Repair and cleaning have also continued to be a problem, particularly on large chandeliers.

Many serious accidents have occurred during the cleaning of the large, expensive chandeliers. A cleaning person must stand on a tall ladder and perform intricate, time consuming movements in order to clean the numerous ornamental surfaces of the chandelier. If the ladder falls — which has often happened — there is inevitably an entanglement between the cleaning person and the chandelier, which results in great damage to the chandelier or serious injury to the cleaning person, or both.

Thus, the object and purpose of the present invention is to provide a chandelier which may be stored, transported, and handled with a minimum of inconvenience and expense, and which at the same time affords unprecedented ease to the operations of installing, repairing, or cleaning the chandelier while in use.

SUMMARY OF THE INVENTION

The chandelier of the present invention is constructed in a modular fashion, with a rigid central frame and a plurality of radially disposed chandelier arms which may be readily attached to or detached from the frame. Each chandelier arm carries separate lamp means and a connecting circuit therefor. The central frame has an energizing circuit for providing energy to all of the lamps. Mating electrical contacts are provided on the central frame and on each of the arms, so that when each arm is mechanically attached to the central frame its lamp is also at the same time connected to the source of energy, and when it is mechanically detached from the frame its lamp circuit is electrically disconnected.

In the preferred form of the invention a male electrical plug is rigidly attached to each chandelier arm as a part thereof, and female receptacle means are provided on the chandelier central body to receive the plugs.

One feature of the invention is that latch means is provided on each of the arms to facilitate the mechanical attachment or detachment of the arm.

In one form of the invention the inner end of each chandelier arm is bifurcated in a vertical direction, and latch means is provided on one of the arm portions.

In another form of the invention the male electrical plug extends horizontally inwardly from the arm inner end, and latch means is associated with the base of the plug.

A separate invention disclosed and claimed herein is a novel female electrical receptacle adapted to received a circular row of male plugs.

DRAWING SUMMARY

FIG. 5 is a cross-sectional elevational view taken on the line 5—5 of FIG. 4;

FIG. 6 is an exploded perspective view of the electrical contact mechanism in the central frame;

FIG. 7 is a perspective view of the contact mechanism in its assembled form;

FIG. 8 is a perspective view, partially exploded and partially in cross-section, showing other details of the electrical contact mechanism;

FIG. 16 is an elevation view of a modified chandelier in accordance with the invention, shown in disassembled form;

FIG. 17 is a fragmentary view taken on the line 17—17 of FIG. 16;

FIG. 18 is an elevation view, partially in cross-section, of the chandelier of FIG. 16 but in its assembled relationship;

FIG. 19 is a plan view taken on line 19—19 of FIG. 18;

FIG. 20 is a cross-sectional elevational view taken on line 20—20 of FIG. 19;

FIG. 21 is a cross-sectional plan view of the distributor assembly taken on the line 21—21 of FIG. 20;

FIG. 22 is a cross-sectional view of the distributor assembly taken on line 22—22 of FIG. 20;

FIG. 28 is a cross-sectional elevational view showing a modified form of both the distributor and the chandelier arm;

FIG. 29 is an elevational view, partially in cross-section showing a further modified form of the distributor and the arm;

FIG. 30 is an elevational view, partially in cross-section, showing still another modification of the arm;

FIG. 31 is a fragmentary perspective view of a latch used in the device of FIG. 30;

FIG. 32 is an elevational view, partially in cross-section, showing still a different form of both the distributor and the arm; and FIG. 33 is a perspective view of a latch used in the mechanism of FIG. 32;

FIRST EMBODIMENT

Reference is now made to the drawings FIGS. 1 through 10, inclusive, illustrating a first embodiment of the invention, which is a chandelier of the basket type.

Figures 1, 2:
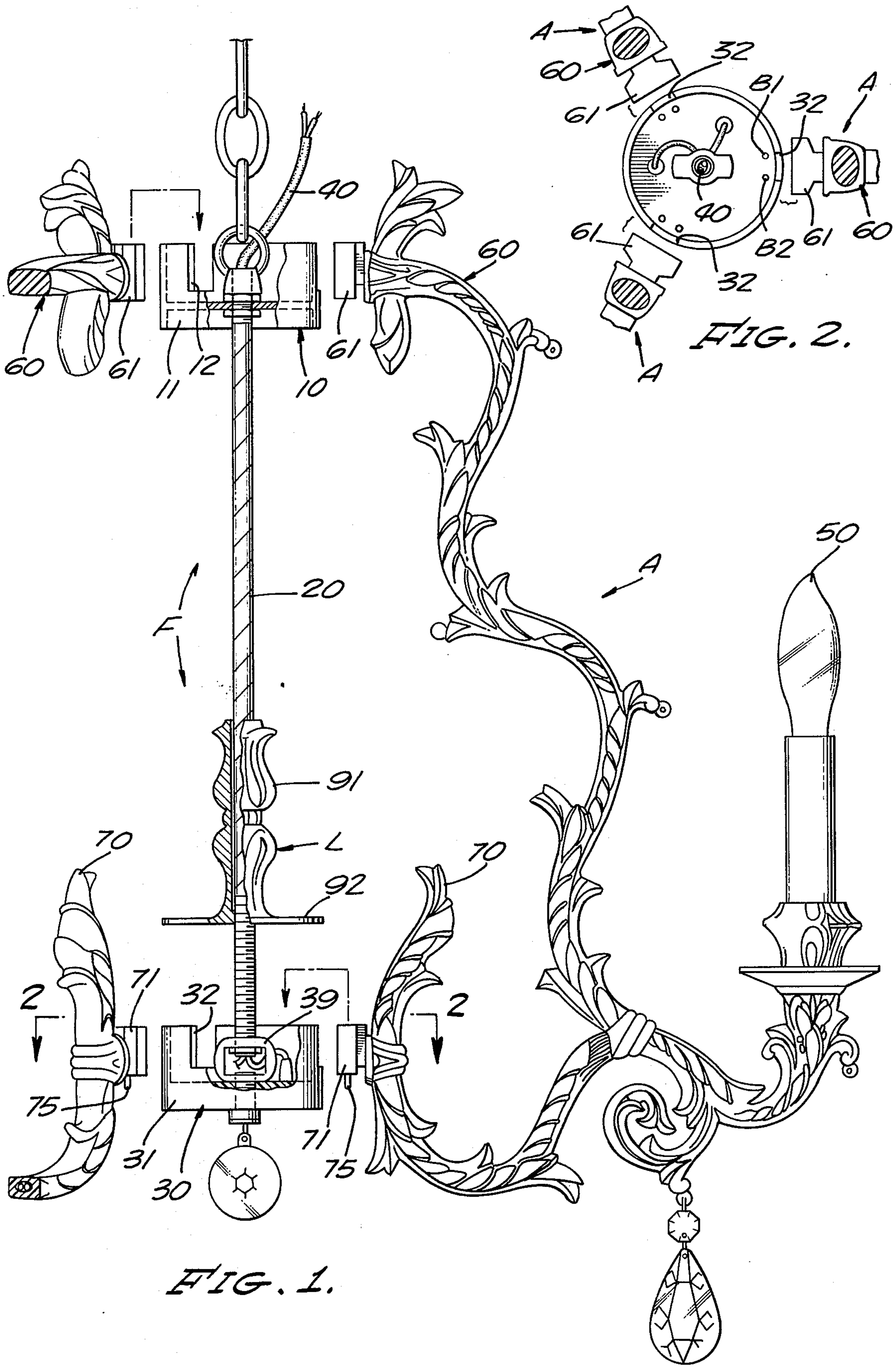
FIG. 1 is an elevation view of a chandelier in accordance with the present invention, shown in disassembled form.
FIG. 2 is a cross-sectional view taken on the line 2—2 of FIG. 1.
Figure 3:
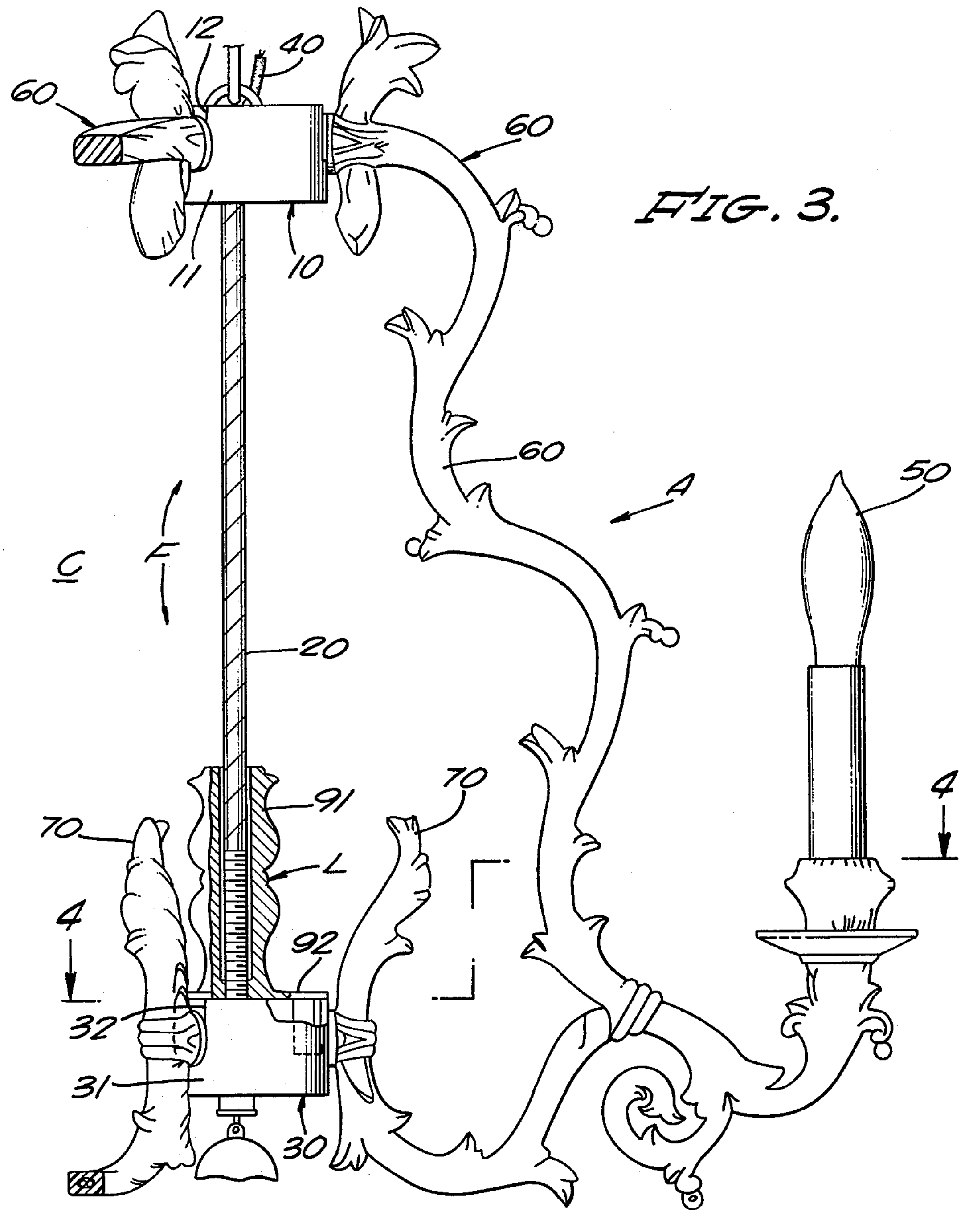
FIG. 3 is an elevation view of the chandelier in its assembled configuration.
Figure 4:
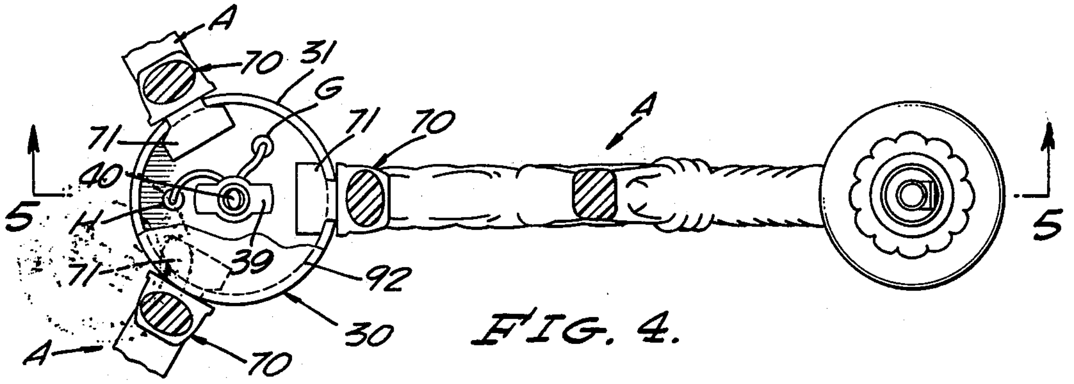
FIG. 4 is a cross-sectional view taken on the line 4—4 of FIG. 3.

The assembled chandelier C (FIG. 3) includes a rigid central frame F (FIG. 1) and a plurality of chandelier arms A (FIG. 1). For purpose of convenient illustration the chandelier is shown as having three radially extending arms A, and as best seen in FIGS. 2 and 4 these arms are spaced 120 degrees apart around the circumference of the central frame F.

The central frame F includes an upper support member 10, a rigid stem 20 extending downwardly from the upper support member 10, and a lower support member 30 attached to the lower end of the stem 20. Upper support member 10 has a cylindrical outer wall 11 in whose upper edge a plurality of upwardly disposed notches 12 are formed.

The lower support member 30 has a cylindrical wall 31 which is generally identical to the wall 11 of the upper support member, and in this outer wall there are formed a plurality of upwardly disposed notches 32. There are three of the notches 32, one for each arm A.

The central frame F also carries an energizing circuit 40 which supplies energy to the lamps of all the chandelier arms. Rigid stem 20 is hollow, and the circuit 40 is embodied in a cable which passes downward through the upper end of stem 20 and hence throughout its entire length into the interior of the lower support member 30. Within the lower support member 30 there are electrical contacts, which will be described later on, for distributing the energy to the respective chandelier arms.

Each of the chandelier arms A (FIG. 1) includes a separate lamp means 50. The inner end of the arm A is bifurcated in a vertical direction so as to provide an upper portion 60 and a separate lower portion 70. It may be noted that, while the primary purpose of the invention is mechanical or utilitarian in nature, it is nevertheless true that the bifurcated construction of the inner end of the chandelier arm lends a distinctive and unique appearance to the product.

It will be noted that each of the arms A occupies a single vertical plane. This is best shown in FIG. 4. Thus the upper portion 60 of the arm is vertically directly above the lower portion 70.

The upper portion 60 of arm A has an integrally formed downwardly depending hook 61, which is adapted to supportingly engage one of the notches 12 of the central frame F. Lower portion 70 of the arm inner end has an integrally formed downwardly depending hook 71 that is adapted to supportingly engage one of notches 32.

Figure 10:
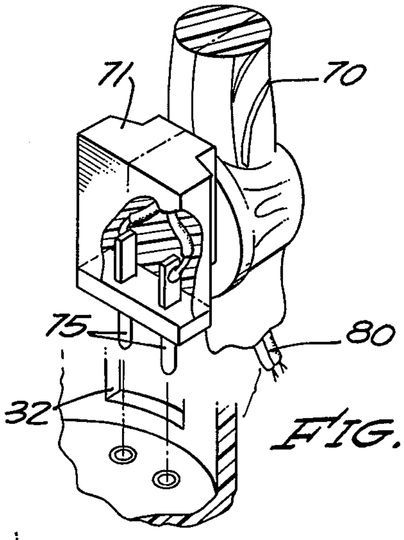
FIG. 10 is an exploded perspective view, partially cut away, showing electrical connection of one of the arms.

Arm A also has an electrical circuit 80 (FIG. 5) which extends from the lamp means 50 throughout the horizontal length of the arm and into its lower portion 70 at its inner end. A pair of male electrical contacts 75 extend downwardly from the lowermost end of the hook 71 (FIGS. 1 and 10). Circuit 80 interconnects the contacts 75 to the lamp means 50.

The female electrical contacts contained within the lower support member 30 are illustrated in FIGS. 5 through 8, inclusive. The first pair of contacts is identified as B1, B2; the second pair as D1, D2; and the third pair as F1, F2. Each pair of contacts distributes electrical energy to a corresponding one of the chandelier arms A.

Each notch 32 together with wall 31 and the associated pair of female contacts provides an electromechanical receptacle.

The male contacts 75 of the arm A together with the female contacts B1, B2 of the lower support member 30 provide a conventional plug-in type of electrical connection. A vertical movement of the arm A serves to either engage the contacts, or to disengage them.

In the assenbly of the chandelier the central frame F is first installed. It is wired to the building, and final inspection of the building may then be completed before the chandelier is fully assembled. This feature of the invention is a great advantage, particularly on large construction projects where many chandeliers are oftentimes damaged before the buildings can be occupied. Not so with the present invention, because the chandelier arms may simply be kept in their storage box until it is time to occupy the building.

In order to assemble the chandelier an arm A is placed in a vertical plane in its proper circumferential position relative to the rigid frame F, and extending in a radially outward direction from the frame. The arm is raised slightly so that the hooks 61, 71 are raised somewhat above the corresponding notches 12, 32. Then the arm is moved radially inward so that the hooks are positioned directly above their corresponding notches. The arm is then moved vertically downward so that both of the hooks supportingly engage their respectively associated notches at the same time. This movement also results in inserting the male electrical contacts 75 into the female contacts B1, B2, thereby completing electrical connection to the lamp means 50. The same procedure is then followed for each of the other two arms.

When all of the arms have been attached to the central frame the final step of the assembly procedure is to lock them in place. The lower portion of rigid stem 20 is externally threaded. A unitary locking member L includes an elongated handle portion 91 having internal threads which engage the threads of the stem 20. At the lower end of handle portion 91 there is a flat circular horizontal plate 92 which is formed integrally with the handle portion. In order to lock the arms in place the unitary locking device L is simply rotated on the threads of stem 20, moving downward to its final position as shown in FIG. 3 where it engages the upper ends of all of the lower hooks 71. Removal of one of the arms A is now impossible without first raising the locking device.

Figure 9:
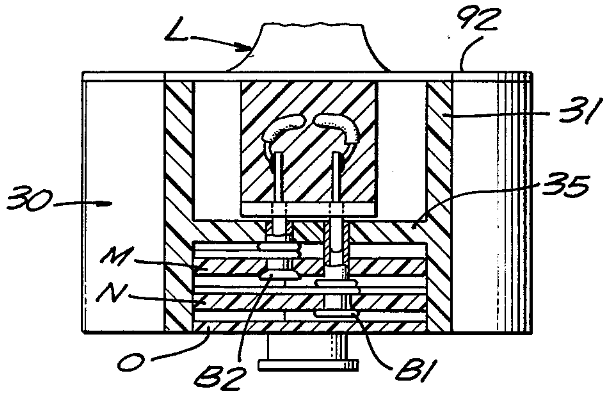
FIG. 9 is a cross-sectional elevation view taken on the line 9—9 of FIG. 5.

Construction of the electrical contact mechanism in the lower support member 30 will now be described in detail. As shown in FIG. 9 the lower support member 30 has a cylindrical plastic cover wall 31 and an integrally formed flat circular plate 35 whose vertical position is about the middle of the length of the wall 31. Below the metal plate 35 are inserted three flat circular plates M, N, O (FIG. 6) each of which is made of insulating material. Plate M is used as the supporting base for the contacts on one side of the circuit. These contacts, B2, D2, and F2 are wired together, and also to a contact H which is connected to one side of the energizing circuit 40. Insulating plate N is used as the supporting base for the other set of contacts B1, D1, F1, which are wired to each other and to a terminal post G which is in turn electrically connected to the other side of energizing circuit 40. Appropriate hole patterns are provided in the plates 35, M, N, so that terminal posts constituting the various contacts will rise upward to appropriate elevations as shown in FIG. 7. Plates M and N are captured within the lower portion of the wall 31 by means of the insulating plate O. A cage member 39 is contained within the upper portion of support member 30 and is threadedly secured to the lower end of stem 20. Central openings are provided through the wall 35, plates M, N, and O, to receive a threaded stem 36 having a nut 37 attached to its lower end, the upper end of stem 36 engaging the cage member 39 so as to hold the entire assembly together.

ALTERNATE FORMS

Figure 12:
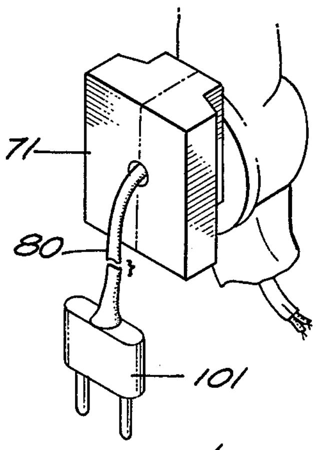
FIG. 12 is a perspective view of a second modified form of the arm.

As an alternative to the plug-in construction of FIG. 10, a different type of plug-in construction may be used as shown in FIG. 12. Here the cable 80 projects through the vertical wall of plug 71 and extends a short distance to a separate conventional male plug 101. Plug 101 is then inserted into a corresponding female receptacle, not specifically shown, either immediately before or immediately after the hook 71 is placed in its supporting notch.

Figure 11:
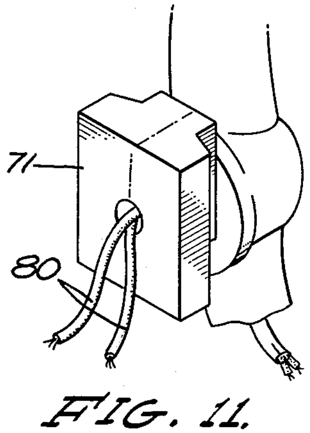
FIG. 11 is a perspective view of a first modified form of the arm.

FIG. 11 illustrates still another method of electrically connecting the arm, in which a plug-in contact is not used. The protruding wires of circuit 80 are wired by hand to complete the internal connections of the chandelier, not specifically shown.

Figure 13:
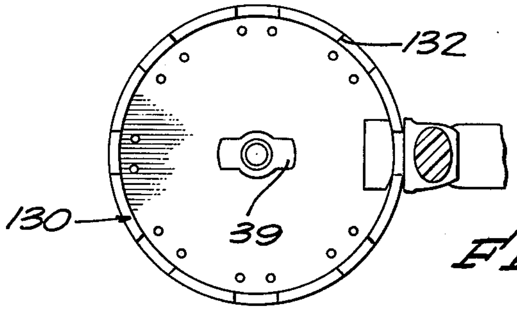
FIG. 13 is a plan view of a first alternate form of the central frame.

FIG. 13 shows a lower supporting member 130 which is designed to support eight radial arms and therefore is provided with eight upwardly facing notches 132 in its outer peripheral wall.

Figure 14:
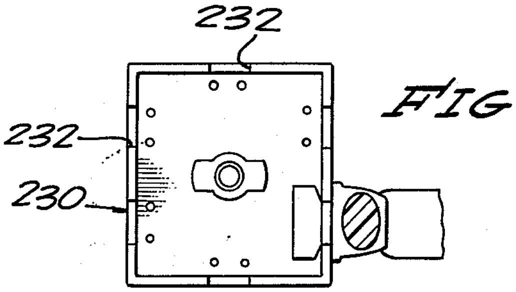
FIG. 14 is a plan view of a second alternate form of the central frame.

FIG. 14 illustrates a lower support member 230 which is of square configuration, with provision for supporting six chandelier arms although their positions are not precisely radial. Two oppositely located walls of the support member have a single notch 232 at their centers, and hence are adapted to support chandelier arms in a precisely radial position relative to the central frame. The other parallel pair of walls each have two notches 232, for supporting a pair of arms that are parallel to each other, and hence neither of these arms would be located precisely radial to the central frame of the chandelier.

Figure 15:
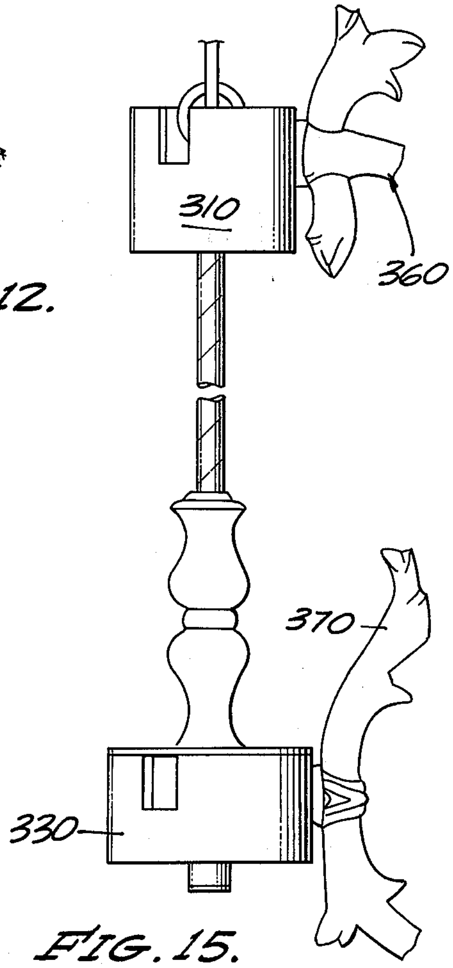
FIG. 15 is an elevation view of the third alternate form of the central frame.

FIG. 15 illustrates a modified form of the chandelier in which the upper member 310 and the lower support member 330 do not have the same diameter measured in a horizontal direction. Specifically, the upper support member is of somewhat smaller diameter than the lower support member. It is therefore necessary to design the chandelier arm so that its upper portion 360 is slightly longer than its lower portion 370, or vice versa.

While the bifurcated construction of the inner end of the chandelier arm would not be essential in a scientific sense, it has great practical importance. The upper portion of the bifurcated inner end is always provided with a hook in order to insure the mechanical stability of the structure. A separate hook on the lower portion of the arm may, if desired, be omitted. It is greatly preferred to incorporate the electric connections in the lower portion of the bifurcated arm, but nevertheless in accordance with the invention it would also be possible to incorporate the electrical connection into the upper portion of the arm, and the energizing circuit is then carried by the upper support member of the frame.

In the construction of lighting fixtures it is conventional practice to keep both conductors of a conductor pair together so that they may be conveniently handled and identified. In accordance with the present invention, however, it may be preferred to separate the circuit, making the positive connection for example through the hook associated with the upper portion of the bifurcated chandelier arm while the negative connection is made through the hook associated with the lower portion of the arm.

SECOND EMBODIMENT

(FIGS. 16 to 26)

Reference is now made to FIGS. 16 through 26, inclusive, of the drawings illustrating a second complete embodiment of the invention.

A modular chandelier C' includes a chandelier central body F' and six chandelier arms A'. Each arm occupies a single vertical plane and is disposed radially of the central body.

The central body F' includes an upper support member 110 and a rigid stem 116 which extends downwardly from the upper support member. A lower support member 120 is attached to the lower end of the stem 116. Upper support member 110 has a cylindrical outer wall 111 in whose upper edge a plurality of upwardly disposed notches 112 are formed. Lower support member 120 has a cylindrical wall 252 in which are formed a plurality of windows 254. Each notch 112 is aligned vertically above one of the windows 254. There are six of the arms A' and hence six of the notches 112 and six of the windows 254.

A typical one of the arms A' is shown in FIG. 16 as well as in FIGS. 17 through 22 and 24, 25. On its outer end the arm A' has a lamp supporting means 145. Its inner end is bifurcated in the vertical direction, including a lower inner end portion 170 and an upper inner end portion 160. Lower inner end portion 170 has a flat vertical pad 171 from which a male electrical plug 172 extends horizontally. Plug 172 includes an insulating base portion 173 and a parallel pair of flat metallic prongs 174 projecting therefrom. Thus the pad 171 provides a shoulder which projects laterally from the plug base 173 and hence perpendicular to the longitudinal axes of the metallic prongs 174.

The upper arm portion 160 has a horizontally extending stub 163 which is disposed essentially parallel to the male plug 172 and in the same vertical plane. The stub has a parallel pair of slots 162 cut vertically on its two sides, leaving a neck or reduced width portion 161. The neck fits within one of the upwardly opening notches 112 (FIGS. 16 and 17). At the top side of stub 163 the notches 162 are of sufficient width to comfortably receive the cylindrical wall 111 of upper support member 110. The bottom end of notches 162, however, is widened on their inward side, i.e., the side extending away from the lamp supporting means 145 and into the interior of support member 110.

Thus as clearly seen in FIG. 16 the arm A' may have its outer end (lamp supporting means 145) tilted upward approximately five to ten degrees from the horizontal, and the neck 161 of stub 163 is inserted in a corresponding one of the notches 112, and the neck will seat fully within the notch because of the widened lower ends of the notches 162. This places the arm A' in a position where, by a downward swinging movement of its outer end, the male plug 172 will be inserted horizontally into a corresponding window 254 of the lower support member 120. In the figures subsequent to FIG. 16 the male plug 172 is shown in its inserted position.

Figure 24:
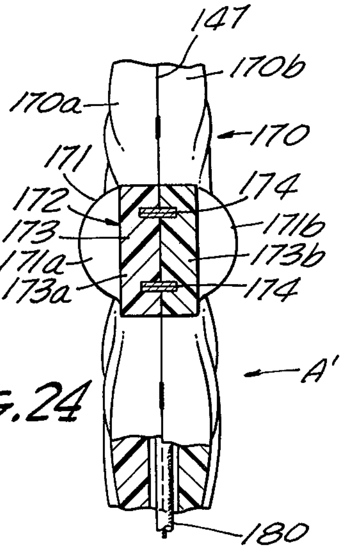
FIG. 24 is a fragmentary cross-sectional view of the chandelier arm taken on line 24—24 of FIG. 20.
Figure 25:
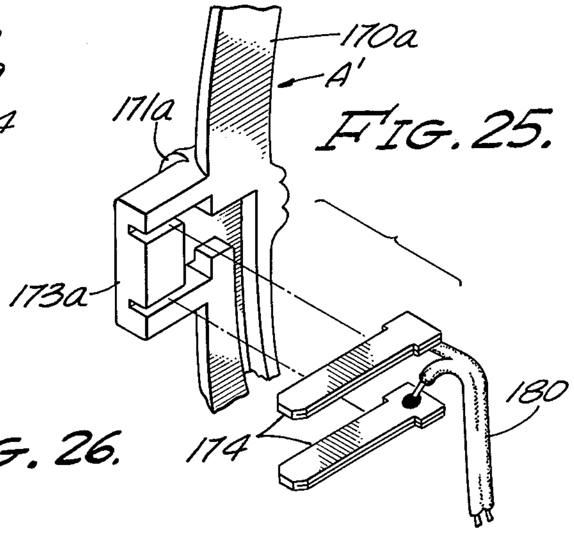
FIG. 25 is an exploded perspective view of the arm inner end.

Reference is now made to FIGS. 24 and 25 which illustrate the internal construction of chandelier arm A'. The arm structure includes two rigid plastic members which are fitted together on a vertical plane 147. The arm lower inner end 170 is made up from a left hand portion 170*a* and a right hand portion 170*b*, as seen in FIG. 24. The arm left hand portion 170*a* has a pedestal portion 171*a* from which an insulating base portion 173*a* protrudes horizontally outwardly (FIG. 25). The arm portion 170*b* is constructed in the same manner. Electric cord 180 is housed internally of the arm in corresponding slots or grooves formed in both of the arm halves. The upper ends of circuit cord 180 are welded to the outward or base ends of the metallic prongs 174. When the arm halves including the left hand portion 170*a* and the right hand portion 170*b* are fitted together and secured by plastic welding or otherwise, the metallic prongs 174 are then captured in pairs of grooves formed in the insulating base portions 173*a*, 173*b*, and these base portions together form an insulating base of rectangular cross-sectional configuration.

FEMALE RECEPTACLE

(FIGS. 20–23 and 26)

Figure 26:
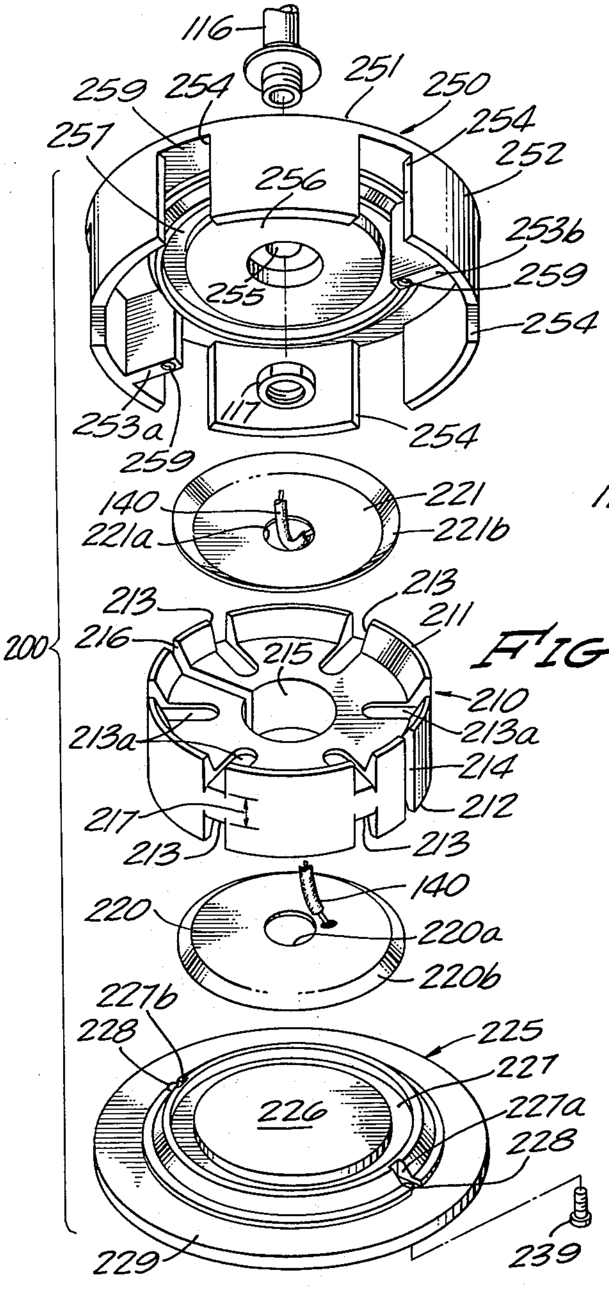
FIG. 26 is an exploded perspective view of the distributor assembly of FIGS. 20 and 23.

Reference is now made to FIGS. 20, 21, 22, 23, and 26 illustrating a novel female electrical receptacle that is provided in accordance with the present invention. An exploded perspective view of the female receptacle, identified generally by reference numeral 200, is shown in FIG. 26. It is also known as the disbributor.

SEPARATE UTILITY

While the female electrical receptacle 200 is illustrated herein as a component part of the modular chandelier of the present invention, it also has separate utility in other and independent applications. For example, this receptacle may be used on an industrial power cord where it will provide for connection thereto of a number of male plugs. Such power cord application is completely separate and independent from the modular chandelier that is disclosed and claimed in this application.

GENERAL FORM

In its general form the female electrical receptacle is adapted for the connection of a plurality of male plugs thereto in a generally circular arrangement, and it includes an insulating base or spacer having a generally cylindrical configuration together with a pair of generally flat circular metallic plates which are disposed on opposing sides of the insulating base. The receptacle also includes a housing having generally circular upper and lower portions between which the insulating base and the metallic plates are disposed in a substantially concentric arrangement. The housing portions are of larger diameter than the insulating base and plates so that there is an annular space within the housing around the periphery of the insulating base. Male plugs may be radially inserted into the housing with the flat metallic prongs of each male plug being received on opposing sides of the insulating base and in electrically conductive relationship with respective ones of these metallic plates.

SPECIFIC STRUCTURE

Figure 23:
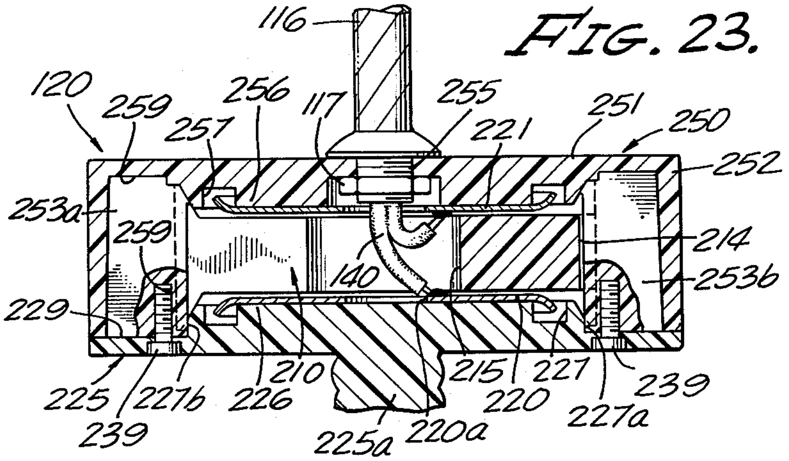
FIG. 23 is a cross-sectional elevational view of the distributor assembly taken on line 23—23 of FIG. 21.

Specific structure of the female electrical receptacle will now be described with particular reference to FIGS. 23 and 26 of the drawings. An insulating base member or spacer 210 has a generally cylindrical configuration with a thickness or axial length of about 1 inch while its diameter is about four inches. The outer circumferential portion of the insulating base member 210 is considerably thickened relative to its central part, having a pair of annular rim portions 211, 212. Spaced around the insulating base 210 every 60 degrees are a pair of slots 213 formed in the rim portions 211, 212. Each of the slots is cut entirely through the corresponding rim and is also countersunk to some extent into the body portion of the base. The bottoms of these slots are separated by a distance 217 (FIG. 26) which is selected to conform to the internal spacing between the flat metallic prongs 174 of male plug 172.

At one point on the periphery of the insulating base 210 a locating groove 214 is formed, which extends in the axial direction and removes all of the associated rim portions 211, 212 at that circumferential location. The groove 214 is formed about midway between two adjacent pairs of the slots 213. Immediately opposite the groove 214, and hence spaced from it circumferentially by 180°, is a groove 216 which is both a locating groove and an access groove. Insulating base 210 is cut away at its center to form a central opening 215. Access groove 216 is cut through the radial portion of the base 210 so as to communicate with the central opening 215.

Metallic plates 220, 221 are of identical configuration and made preferably of copper or copper alloy having good electrical conductivity. Plate 220 has a small central opening **220*a* and the outer circumferential edge 220*b* of the plate is bent slightly forward to form somewhat of an inverted dish configuration. Plate 220 is disposed on the underside of insulating base 210. Plate 221, while of identical configuration, is disposed on the upper side of insulating base 210, hence the angled edge portion 221*b* of plate 221 forms an upwardly opening dish-shaped configuration. Plate 221 also has a central opening 221*a***.

A lower housing portion 225 and an upper housing portion 250 are both made of insulating material such as plastic, and are adapted to surround and enclose the insulating base 210 and conducting plates 220, 221. Conducting plates 220, 221 are of such diameter as to fit on respective sides of the insulating base 210 and radially within the rims 211, 212, respectively. Thus the diameters of the plates 220, 221 are somewhat less than the diameter of insulating base 210. The diameter of housing portions 225, 250, however, is significantly greater than the diameter of insulating base 210, so that in the assembled relationship of the receptacle as shown in FIG. 20 or FIG. 23 there is an annular space 260 surrounding the insulating base 210 but within the confines of the housing. Housing portion 250 has generally the configuration of an inverted cup, and for convenience will hereafter be referred to as the cup. Housing portion 225 is generally arranged as a cover or lid for the cup, and will hereafter be referred to as the lid.

The lid 225 has generally the configuration of a circular plate, with downwardly depending central portion **225*a* as shown in FIG. 20 being provided thereon solely for artistic purposes. The upper central portion of the lid 225 provides a raised base or pedestal 226 as best seen in FIG. 26. Around the pedestal 226 there is formed a circumferential groove or trough 227. Beyond the trough 227 the pedestal tapers downward to a horizontal shoulder portion 229. In the tapered circumferential wall of pedestal 226 there are formed a pair of positioning notches 227*a*, 227*b***, which are on diametrically opposite sides of the lid.

The cup 250 includes a generally flat circular plate portion 251 having a circumferential cylindrical wall 252 depending downwardly from the outer circumferential edge thereof. In the center of the plate portion 251 on its lower side there is formed a downwardly extending pedestal portion 256. An upwardly extending groove or trough 257 extends circumferentially about the pedestal 256. Beyond the trough 257 the cup 250 has a pair of partial radial walls **253*a*, 253*b* formed therein. These partial walls are on diametrically opposite sides of the cup, hence being separated by an angular distance of 180°, and are therefore collinear. Each partial radial wall is integral with the circumferential wall 252 and also with the adjacent portion of the pedestal 256. The cylindrical wall 252 has a set of six rectangular windows 254 formed therein. The windows are spaced apart by circumferential angles of 60°. Each window extends through the full vertical height of cylindrical wall 252, all the way to the horizontal shoulder 259 of the plate portion 251** of the cup.

It will also be noted in FIG. 26 that the partial radial walls **253*a*, 253*b* are each located approximately midway between the adjacent pair of windows 254. In the assembled relationship of the female receptacle the locating groove 214 receives the radially inner end of one of the wall portions 253*a*, 253*b*, the main radial length of the wall portion extending across the otherwise open annular space 260. The other one of the partial walls 253*a*, 253*b* is received in the locating and access groove 216. Thus the insulating base 210 is locked in its circumferential position in the cup 250, and is not free to rotate therein. When lid 225 is added underneath the insulating base its locating notches 227*a*, 227*b* are fitted over the inner corners of the partial walls 253*a*, 253*b*. Holes 228 adjacent the notches 227 permit the insertion of fastening screws 239 which are received by threaded openings 259** of the partial radial walls.

Before assembling the receptacle it is necessary to attach the electrical supply circuit 140 thereto. The plate 251 of housing cup 250 has a central opening 255 therein which receives the lower end of rigid stem 116, which is then secured by a nut 117. The two-conductor cable 140 extends downward through the rigid stem 116, and through opening **221*a* of contact plate 221. The end of one of the insulated wires is then welded to the under surface of plate 221 while the other wire is welded to the upper surface of plate 220, both welds being made near the respective central openings of the contact plates. The wires are welded before the contact plates are assembled to the insulating base 210. Access groove 216 then permits the plates to be assembled laterally to the insulating base 210, by moving the cable 140 through the access groove 216 in a radial direction into the central opening 215 of insulating base 210**.

Operation of Female Receptacle

In the assembled condition of the female receptacle the downturned peripheral edge of contact plate 220 extends freely into the clearance trough 227. In similar fashion the upturned edge of plate 221 extends into the clearance trough 257. The male plug 172 of each arm A' is inserted into one of the windows 254, so that the insulating base 173 of the male plug occupies a portion of the annular space 260 inside the housing. Metallic prongs 174 extend through the associated pair of grooves 213 in the insulator base 210. The radially inward extensions **213*a* of the grooves 213 serve to lock the metallic prongs 174 against any circumferential twisting movement. The shoulder or pedestal portion 171 of the arm portion 170 comes into engagement, or nearly so, with the outer circumferential surface of the cylindrical wall 252 of the housing. At the same time the insulating base 173 of the male plug comes into engagement, or nearly so, with the outer cylindrical surface of the insulating base 210, and the side walls of base 173 are received by the side walls of the rectangular window 254 in interfitting relationship (see FIGS. 21, 22**).

The axial space between insulator base 210 and the pedestals 226, 256 of the housing is more than sufficient to receive the conducting plates 220, 221. When a male plug is inserted, however, the metallic prongs 174 engage the outwardly curved surfaces of the plate 220, 221, forcing the plates slightly apart at that point on their circumferences, and when the plug is fully inserted the plates are then forced into relatively tight axial engagement with the pedestals 226, 256, respectively. A substantial length of each metallic prong 174 is then in face-to-face engagement with the inner surface of the associated metallic plate (see FIGS. 20–22). A slight axial space then appears between the plates 220, 221 and the insulating base 210 as shown in both FIGS. 20 and 23. This floating relationship of the metallic plates to the insulator and housing structure insures smooth making and breaking of the electrical contacts, and also solves a problem of manufacturing tolerance requirements which might otherwise exist.

METAL ARM

Figure 27:
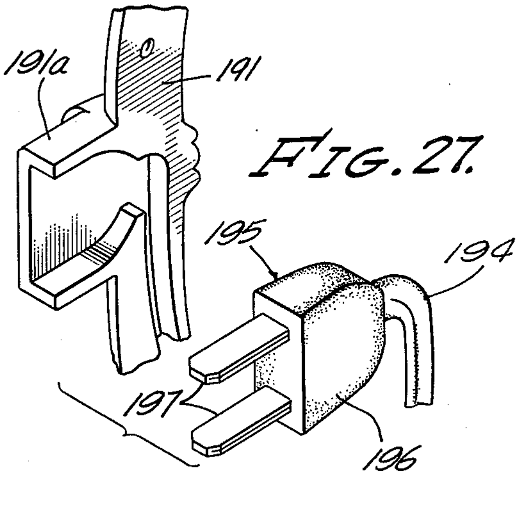
FIG. 27 shows another alternate form of the inner end of the chandelier arm.

FIG. 27 illustrates a metal arm structure in accordance with the invention. The arm is made in mating halves 191, 192, only one of which is shown. A conventional electric cord 194 with conventional male plug 195 attached is then inserted in slots formed inside the arm parts. The insulating base 196 of the plug 195 fits precisely within the protuberances 191*a*, 192*a* of the arm structure. The metallic prongs 197 of the plug then extend horizontally outward from the insulating base 196 as well as the arm protuberances.

In operation, the arm structure of FIG. 27 is inserted into the female electrical receptacle in exactly the same manner as the plastic arm with integrally formed plug of FIG. 25. That is, both the insulating base 196 of the plug 195 and the arm protuberances 191*a*, 192*a* occupy a portion of the annular space 260 in the housing.

THIRD EMBODIMENT

In the first complete embodiment of the invention an upper support member 10 is provided in the chandelier for attachment thereto of the bifurcated upper end of the arm A. A cantilever support for the arm is then achieved by supporting the arm from the upper support member 10, as well as from the lower support member 30. This is a basket type chandelier.

In the second complete embodiment of the invention the same type of cantilever support for the arm A' is illustrated. The bifurcated inner end of the arm is supported from its lower portion 170 by means of male plug 172 inserted into the support member 120. The upper arm portion 160 is attached to the upper support member 110.

It is not necessary, however, to bifurcate the inner end of the chandelier arm in order to carry out the principles of the present invention. The necessary cantilever support for the arm may be provided from the same housing support on the chandelier as receives the male electrical plug connection. This is done by mechanical latch means formed cooperatively by the housing adjacent each of the windows, and the insulating base of each associated arm. Four different structural arrangements for accomplishing this result are shown in FIGS. 28, 29, 30, and 32, respectively, illustrating chandeliers of the spindle and arm type.

Reference is now made to FIG. 28 illustrating a third embodiment of the invention. The chandelier arm A'', while not shown in full in the drawing, is a single arm structure whose inner end is not vertically bifurcated. Chandelier central body 400 incorporates a female receptacle that is generally similar to that illustrated in the second embodiment of the invention. While not shown in complete detail, the chandelier central body does not include upper and lower support members, but has only the single support member as illustrated. A plurality of the arms A'' are attached in circumferentially spaced positions around the chandelier central body 400, there being preferably six such arms as in the previous illustration.

Specifically, the chandelier central body 400 includes a cup-shaped housing member 410 which opens upwardly, a housing lid 440, and a housing lock 450. The cup-shaped housing member 410 includes a generally flat circular lower plate 420 having a downwardly depending central portion 421 for artistic purposes only. The upper portion of plate 420 has a raised pedestal 426 which has a circumferential trough 427 formed near its outer edge. A cylindrical wall 415 extends upwardly from the outer periphery of the plate 420.

The internal structure of the female receptacle of FIG. 28 is the same as that shown in FIG. 26. Specifically, the same insulating base 210 is used, and the same metallic plates 220, 221 are used, the interrelationship between the plates and the insulator base being the same as in the previous embodiment. Furthermore, the lower plate 220 fits into the housing portion 420 in the same manner as it fits into housing portion 225 of FIG. 26. Also, upper plate 221 fits into housing portion 440 in the same manner as it fits into the housing portion 250 of FIG. 26. The lid 440 has a downwardly depending central portion forming a pedestal 446, and a circumferential trough 447 is formed near the outer edge of the pedestal. Housing member 420 fits upon and cooperates with the lower surface of insulator base 210 in the same manner as does the housing portion 225 of FIG. 26. Housing lid 440 fits upon and cooperates with the upper part of the insulator base 210 in the same manner as does the housing portion 250 of FIG. 26. The insulator base 210 is, however, inverted so that the threaded openings 259 formed therein face upwardly for receiving the fastening screws 439.

The arm A'' on its inner end has a pedestal 470 from which the insulating base 471 of a male plug extends horizontally inwardly. The metallic prongs 474 of the plug protrude further inwardly from the insulator 471. The illustrated male plug is inserted into the housing with insulator base 471 thereof occupying a portion of the annular space 460 within the housing, while the metallic prongs 474 extend above and below the insulator base 210, respectively, in engagement with the contact plates 220, 221.

In the third embodiment as shown in FIG. 28 the chandelier includes a rigid stem 452 whose lower end is threaded and received within a threaded central opening of the housing lid 440. A nut 454 threaded on the stem 452 above the housing lid is tightened downwardly for securing the housing firmly in place on the lower end of the stem 452. Electrical cord 140 extends downward through the stem 452 and into the interior of the insulator base 210 where it is welded to the contact plates 220, 221, in the same manner as before.

The novel feature of the third embodiment as shown in FIG. 28 is the housing lock 450, and including its cooperative action in locking each of the arms A" securely in place. The housing lock 450 is integrally formed, preferably of plastic or like material, and has the configuration of a shallow cup with downward opening, and having a base or handle portion extending above the bottom of the cup. The member 450 has a central threaded opening therein and it is threaded upon the rigid stem 452. When all six of the arms A" have been inserted into the housing in their respective positions, the lock 450 is rotated by hand and screwed downward so as to firmly hold all of the arms in place. The lock 450 then becomes a functional part of each window 254.

Thus it will be seen that the arm A" has a small notch 472 formed in the upper surface of the base 471 of the male electrical plug, the notch 472 being immediately adjacent the vertical pedestal 470. The horizontal length of the plug base 471 is such that the face of the base 471 on the inward end of the arm engages the circumferential surface of the insulator base 210, while the outer end of plug base 471 extends not only to the outer circumference of the housing cup 420 and the housing lid 440, but also extends somewhat further so as to correspond with the additional diameter of the housing lock 450. When arm A" is inserted in place, as shown in FIG. 28, therefore, the notch 472 falls outside the diameter of housing lid 440 (at least for the most part) but falls immediately under the circumferential flange of the housing lock 450. Therefore, when the lock is tightened down into its locked position, as is shown in FIG. 28, arm A" is secured.

It will be noted that in the third embodiment of the invention as shown in FIG. 28 the metallic prongs 474 of the male plug provide both electrical connection and a certain amount of mechanical support for the arm A". The height of each window formed in the housing cup 410 is such that the outer extremity of the plug base 471 receives a vertical underneath support. Furthermore, the upper part of the plug base 471 is precluded from twisting outwardly from the housing by virtue of the notch 472 which is occupied by the downwardly extending flange of the housing lock 450.

Thus it will be seen that in the third embodiment of the invention, as in the preceding embodiment, mechanical support for the arm is derived not only from the interengaging electrical contacts, but also from separate mechanical latching means which is formed cooperatively between the arm and the central chandelier body. Specifically, one part of the additional latching means is formed on the chandelier arm while the mating part is formed on the central chandelier body.

ALTERNATE FORMS

Alternate forms of the single arm structure are shown in FIGS. 29, 30 and 32. In each of these embodiments the significantly different feature is the particular form of the mechanical latching means, independent of the interengaging electrical contacts, which is utilized for providing a cantilever support to the chandelier arm.

Thus in FIG. 29 the central chandelier body 400' includes a cup shaped lower housing member 480 and a housing lid 485. The structure and operation of the insulator base 210 and contact plates 220, 221 are the same as previously described. The cooperative relationship of the insulator base 210 and contact plates 220, 221 with the housing portions is also the same as previously described. Arm A''' has an insulator base 490 forming part of an inwardly extending male plug. A small upward protrusion or pin 491 is formed on the upper and inner end of the plug base 490. A small downward protrusion 492 is formed on the lower and outer end of the plug base 490. Metallic prongs 494 extend horizontally inwardly from the inner end of plug base 490, as in the previous embodiments. The metallic prongs are disposed respectively above and below the insulator base 210 and in conductive engagement with the contact plates 220, 221.

As shown in FIG. 29, the window in the cylindrical wall of cup shaped member 480 is of sufficient vertical height to permit the plug base 490 with upwardly protruding pin 491 to pass therethrough. The outer end of the arm is canted somewhat upwardly in order to permit the protruding portion 492 of the plug base to enter the housing window. Housing portion 480 has a small recess in its upper surface which receives the protrusion 492 of plug base 490. The protrusions 491, 492 of the plug base then provide a force couple, one being supported against the housing lid 485 while the other is supported against the lower flat portion of the housing cup 480, with the result that a firm cantilever support for the arm A''' is provided.

In FIG. 30 the arm A5 is latched by a somewhat different means. Plug base 510 has shallow grooves 511, 512 formed in its upper and lower surfaces, respectively, which grooves extend in a direction circumferentially of the central chandelier body 400". A clamping ring 515 is positioned within the annular space within the housing above the male plug portions of the arms, while a clamping ring 516 is positioned in the same annular space below the male plugs. A fragmentary portion of ring 516 is shown in FIG. 31. The ring 516 is a flat circular ring having small U-shaped cuts made ever 60° around its circumference to provide flap portion **516*a* which are bent upwardly to form holding springs. Each of the holding springs is located adjacent one of the windows of the housing 400". The upper clamping ring 515 is formed in the same manner and its holding springs also are located opposite the respective windows of the housing. When arm A5 is positioned by inserting its male plug into the corresponding window of the housing, the holding springs 515*a*, 516*a*, engage the grooves 511, 512, respectively of the male plug base 510. In this manner a cantilever support for the arm is provided, separate and independent from the mechanical support that is provided by the interengagement of the plug prongs 514 with the plates 220, 221 and insulator base 210**.

As shown in FIG. 32 the arm A6 is supported in a manner similar to that shown in FIG. 30. Plug base 520 has a pair of notches 521 formed in its upper surface and a pair of notches 522 formed in its lower surface. A pair of small spring clips 525, 526 are positioned respectively above and below the plug base and supported by the corresponding notches. Thus the spring clip 525 as best seen in FIG. 33 is a small rectangular piece of metal having three straight parallel bends therein which form the product into a somewhat U-shaped configuration. The downwardly depending edges are received by the notches 521 of the plug base 520 while the upper central ridge portion of the spring clip engages the associated housing member. A small notch 531 is formed in the upper housing member to hold the spring clip 525 in place and a similar notch 532 is formed in the lower housing member to hold the spring clip 526 in place.

Thus the arm A6 receives a secure cantilever support independent of the engagement of metal prongs 524 with the contact plates 220, 221 and insulating base 210.

FOURTH EMBODIMENT

Figures 34, 35, 36:
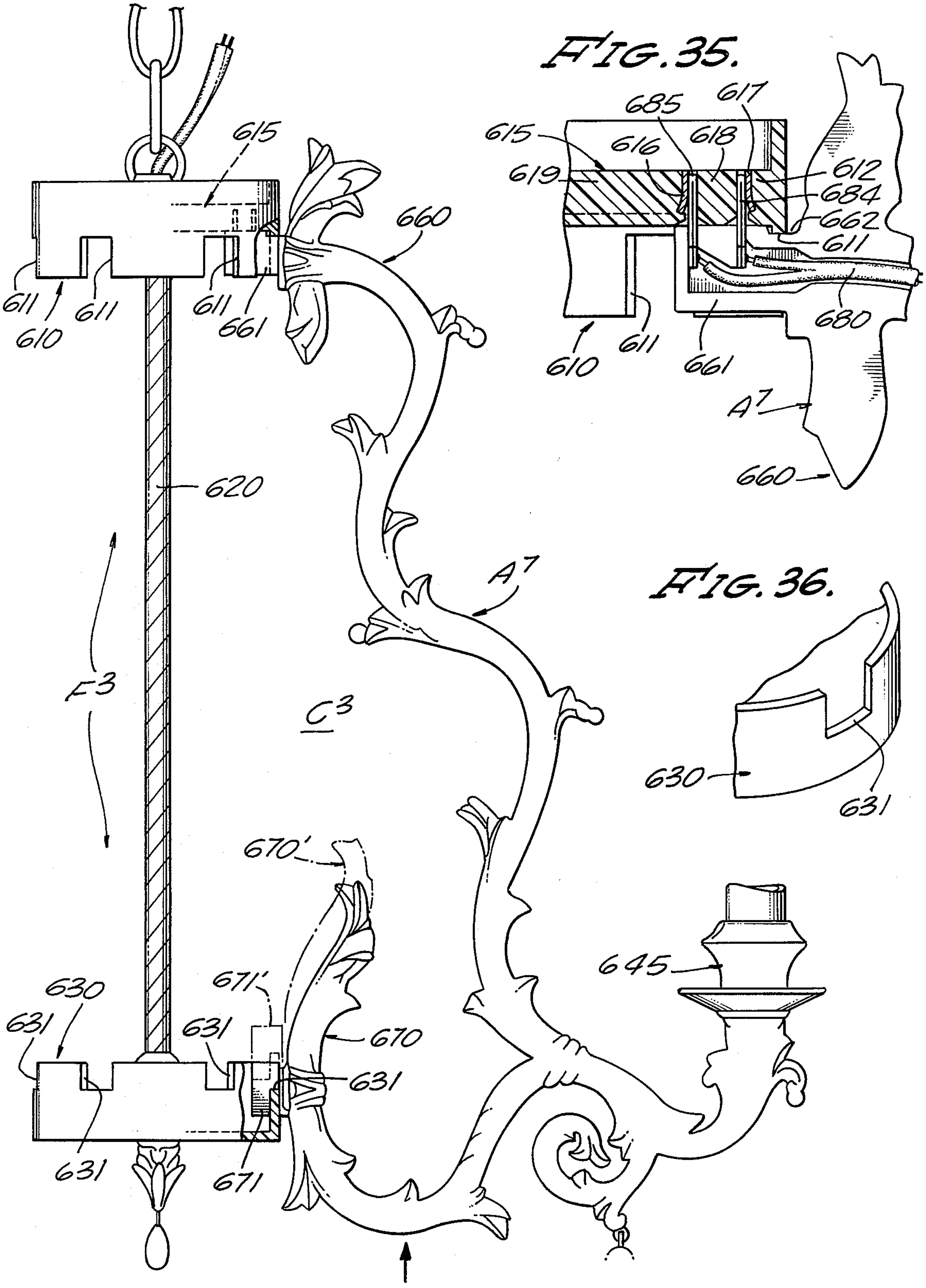
FIG. 34 is an elevation view of a basket type chandelier incorporating a fourth major embodiment of the invention.
FIG. 35 is a fragmentary cross-sectional view showing the upper connection of the arm of FIG. 34.
FIG. 36 is a fragmentary perspective view showing the lower connection of the arm of FIG. 34.

Reference is now made to drawing FIGS. 34 to 36, inclusive, illustrating a fourth major embodiment of the invention. This is not a spindle and arm type of chandelier as shown in FIGS. 29 through 33, but rather, is a basket-type chandelier as shown in the first two embodiments of the invention.

Thus a chandelier $C^3$ includes a central body $F^3$ and a plurality of arms $A^7$, only one of which is shown. As will be apparent, frame $F^3$ is designed to accept six of the arms $A^7$.

Thus the frame $F^3$ includes an upper support member 610 having a rigid member 620 extending downwardly therefrom, and a lower support member 630 attached to the lower end of the rigid member 620. Since electricity is distributed to the arms through the upper support member 610, the rigid member 620 need not be hollow but may instead be a solid member if so desired. Upper support member 610 is a generally cup-shaped member opening downwardly and having six notches 611 in its circumferential wall. Lower support member 630 is a generally cup-shaped member opening upwardly, and having a set of six notches 631 in its circumferential wall. The notches 611, 631 are vertically aligned in pairs so as to receive corresponding ones of the arms $A^7$.

Arm $A^7$ has its inner end bifurcated, forming upper arm portion 660 and lower arm portion 670. It has lamp holding means 645 on its outer end. Circuit means 680, shown only in FIG. 35, is contained within the upper arm portion 660 for conveying electrical energy to the lamp holding means 645. Lower arm portion 670 has an integrally formed hook 671 which extends downwardly and is adapted to engage one of the notches 631 so as to support the lower arm portion 670 from the lower support member 630. Upper arm portion 660 has an integrally formed plug portion 661 which extends upwardly and is adapted to engage one of the notches 611 for supporting upper arm portion 660 from the upper support member 610 (See FIGS. 34 and 35). The arm structure is preferably made of a rigid plastic material but which has some resiliency, and it is therefore possible to deform the inner arm portions 660, 670 slightly toward each other for the purpose of attaching or detaching the arm. Thus as shown in FIG. 34, when the arm is to be detached, the lower arm portion 670 is raised to an elevated position as shown by dotted lines 670', 671', and is then swung outwardly a short distance before it is released downwardly. This then permits the upper plug 661 to be pulled downwardly from the upper support member 610. The reverse procedure is utilized for attaching the arm to the chandelier central body $F^3$.

An electrical distributor 615, which may also be referred to as the female electrical receptacle, is incorporated within the upper support member 610. The operative part of distributor 615 is a pair of cylindrical, concentrically disposed, metal rings 616, 617. The upper support member or housing 610 has an interior annular shoulder portion 612 which receives the outer ring 617. A ring 618 of insulating material is disposed within the metal ring 617, but leaving small circumferential spaces on each side, adjacent both of the metal rings. The interior of the inner metal ring 616 is filled with an insulating cylinder, or circlar plate, 619. The insulators 618, 619 are supported by means not specifically shown. Electrical energy is supplied to the distributor rings 616, 617, by means not specifically shown.

The arm $A^7$ is preferably formed in two symmetrical halves which are attached on a vertical plane. Plug 661 is formed integral with the arm upper portion 660. As shown in FIG. 35, vertical slots formed in the plug 661 receive an outer metallic prong 684 and an inner metallic prong 685. These prongs are electrically connected to respective conductors of the cable 680 that is contained within the arm for energizing the lamp holding means 645. The upper and outer portion of plug 661 has an upwardly facing notch 662 formed therein which receives the downwardly depending wall of the cylindrical housing member 610. The upper plug 661 in conjunction with lower plug 671 therefore provides a cantilever support for the arm.

When the upper plug 661 is inserted into the upper housing 610 the male prongs 684, 685 are inserted into the respective circumferential openings adjacent the distributor rings 616, 617. A suitable opening is provided between the lower surfaces of the insulators 618, 612to smoothly guide the prong 684 into conductive relationship with ring 617. A similar-opening is provided between the lower surfaces of insulators 618, 619 to smoothly guide the male prong 685 into conducting relationship with the inner distributor ring 616.

OTHER MODIFICATIONS

Three major embodiments of a basket-type chandelier in accordance with the present invention have been illustrated. As shown in the first embodiment of FIGS. 1 through 10, both the upper and lower inner portions of the arm may be provided with downwardly depending hooks which engage the corresponding support members of th chandelier central frame, and a male electrical plug may be incorporated into one of these hooks for mating engagement with the female receptacle that is carried by the central body. In the first embodiment the male plug is carried by the lower portion of the arm. In the second major embodiment illustrated in FIGS. 16 through 26 it is shown that the upper hook may depend downwardly while the lower hook may move horizontally inwardly for engaging the central frame of the chandelier. While the male plug is there illustrated as being contained within the lower portion of the arm, it will nevertheless be understood that the male plug may instead be incorporated in the upper portion of the arm, and the same method of attching the arm may still be used.

The second embodiment of the invention disclosed in FIGS. 16 through 26 also introduces the concept of a female electrical receptacle, or distributor, which incorporates a pair of circular conductors. In the second embodiment these conductors are illustrated as horizontal flat plates with a vertical separation between them. However, as shown in the third embodiment of FIGS. 34 through 36, and being particularly illustrated in FIG. 35, these circular conductors may if desired be concentric cylindrical rings.

In the third major embodiment of the basket-type chandelier as shown in FIGS. 34 to 36 the arm is made of somewhat resilient material so that the upper and lower portions of its inner end may be compressed together for the purpose of attachment or detachment. The upper arm portion has an upwardly extending plug and the lower arm portion has a downwardly extending hook. The male electrical plug is here illustrated as being provided on the upper portion of the arm, and hence the distributor or female receptacle is contained within the upper support member of the chandelier central body. It will be understood, however, that the same method of attaching the arm may be employed, and the electrical connections made at the lower end of the chandelier central body. Further, though not specifically illustrated in the drawings, one electrical connection may be made at the upper arm portion and the other at the lower arm portion, if so desired.

The present invention is not restricted to chandeliers of the basket-type but also extends to chandeliers of the single arm type, commonly known in the trade as spindle and arm chandeliers. Drawing FIGS. 28, 29, 30, and 32 have illustrated four different methods of incorporating the electrical connection into the arm while concurrently providing it with the necessary cantilever support. In all of these embodiments the distributor has been illustrated as being of the type in which the conducting rings are horizontal flat plates. It will be understood, however, that the single arm type of chandelier may if desired incorporate concentric cylindrical distributor rings as shown in FIG. 35. It is then preferred to have the plug of the arm extend downwardly. The arms are then latched by utillizing a lock of the type shown in FIG. 28, or other equivalent means.

In general, a distributor in accordcance with the preferred form of the invention includes a pair of generally circular contact plates each of which is circumdisposed about the vertical axis of the chandelier central body. Each contact plate has points of initial contact which form the locus of a circle, and also has a contact surface which extends linearly away from the initial contact points. The two contact plates are so arranged relative to each other that their two contact surfaces are disposed in parallel relationship. While plates 220, 221 have been shown as generally flat plates arranged in horizontal planes, and the plates 616, 617 have been shown as generally cylindrical rings arranged concentrically, it will nevertheless be understood that the invention also contemplates the use of plates having a dished or sloped configuration and which have their contact surfaces extending at an angle, partially horizontal and partially vertical.

An important advantage of the present invention is that the pair of generally circular contact plates, having their two contact surfaces disposed in parallel relationship, may be manufactured precisely the same regardless of the number of chandelier arms that are to be incorporated into the chandelier. Thus, the same contact plates may be used for a chandelier having two arms, or for a chandelier having twelve arms.

Another form of the invention, not specifically illustrated, is a wall lamp which is often known in the trade as a bracket-type fixture. The wall lamp or fixture is typically provided with one, two, three, or four arms. The distributor assembly of the present invention is then cut on a vertical plane, preferably on its vertical axis, so as to provide a semi-cylindrical structure. The flat wall of the semi-cylinder faces against the wall of the building while the curved outer wall faces into the room and has windows which receive the chandelier arms therein.

The invention has been described in considerable detail in order to comply with the patent laws providing a full public disclosure of at least one of its forms. However, such detailed description is not intended in any way to limit the broad features of principles of the invention, or the scope of patent monopoly to be granted.

What is claimed is:

1. A modular chandelier with plug-in arms, comprising:

a chandelier central body having a generally circular peripheral wall and having a plurality of circumferentially spaced windows formed in said wall;

a distributor disposed within said central body, including a flat insulating spacer aligned with said windows, a pair of flat circular metallic plates engaging the upper and lower surfaces, respectively, of said spacer, and the circumferential edges of said plates being radially curved away from said spacer and from each other;

means restraining the movement of each of said plates in a vertical direction away from said spacer;

a plurality of detachable chandelier arms, each having on its inner end a rigidity extending male plug which includes an insulating base and a parallel pair of flat metallic prongs projecting therefrom; and the distance between said plug prongs being substantially equal to the thickness of said spacer, and each said plug base being of such size and configuration as to be insertable within a corresponding one of said windows, whereupon the associated flat metallic prongs come into firm contact througout a substantial portion of their length with the respective metallic plates;

each said window being of non-circular configuration and the corresponding insulating base being of non-circular configuration and interfitting therewith.

2. A chandelier as in claim 1 wherein said central body includes a generally cup-shaped member formed integrally from plastic material, and a generally circular lid member made from plastic material and which removably covers said cup-shaped member.

3. A chandelier as claimed in claim 1 wherein the configurations of said insulating spacer and said metallic plates are such as to cooperatively provide, near the outer edges of said plates, axially extending gaps which receive respective ones of said plug prongs.

4. A chandelier as claimed in claim 1 wherein one of said plates has a central opening therein, and which additionally includes a pair of insulated wires, one wire of said pair extending through said opening in said one plate, and said wires having their ends secured to respective ones of said plates in conductive engagement therewith.

5. A chandelier as claimed in claim 1 wherein said distributor is spaced inwardly from said peripheral wall of said central body to provide an annular space fore receiving the insulating base of each of said chandelier arms.

6. A chandelier as claimed in claim 1 wherein each chandelier arm has on its inner end a laterally projecting shoulder, whereby when the associated plug base is inserted into a corresponding one of said windows, said shoulder abuts the peripheral wall of said central body.

7. A chandelier as claimed in claim 1 wherein each of said windows is of rectangular configuration, and the insulating base of each of said chandelier arms has a rectangular cross-sectional configuration adapted to fit within the corresponding window.

8. The chandelier of claim 1 which further includes mechanical latch means on the insulating base of each of said arms, and cooperating latch means associated with said central body for releasably securing said arm therein.

9. A modular chandelier comprising:

a rigid central frame;

a plurality of chandelier arms which are readily detachable, both mechanically and electrically at the same time, from said frame;

each of said arms having a vertically bifurcated inner end with the upper portion thereof forming a vertically extending hook and the lower portion thereof forming a horizontally extending male electrical plug;

said rigid frame having cooperating upwardly opening notches for receiving said hooks, and horizontally outwardly opening female receptacles for receiving said male plugs; and each hook and its cooperating notch permitting a pivotal movement of the associated arm in a vertical plane;

whereby each arm is attached to said frame by first elevating its outer end, then engaging its hook with the associated notch, and finally moving the outer end of the arm downwardly to produce a downward pivotal movement of the arm until the male plug on the lower portion of its inner end is horizontally inserted into the associated female receptacle.

10. In a modular chandelier having plug-in arms, the combination comprising:

a generally cup-shaped body member integrally formed of plastic material and having a plurality of circumferentially spaced rectangular windows formed in its side wall;

a substantially circular plastic lid member covering the top of said body member;

a generally flat circular insulating spacer disposed within said body member and aligned with said windows;

a pair of generally flat circular metallic plates disposed upon the upper and lower sides, respectively, of said spacer, the circumferential edges of said plates being radially curved away from said spacer;

and at least one detachable arm assembly including a relatively rigid plastic arm housing whose inner end abuts the exterior wall surface of said body member adjacent one of said windows, a plastic insulating base of rectangular cross-sectional configuration formed integral with said arm housing and extending from said inner end thereof into and through said one window, and a parallel pair of flat metal prongs projecting from said insulating base and engaging the upper and lower sides, respectively, of said spacer and the inner surface of respective ones of said plates.

11. A chandelier as claimed in claim 10 wherein one of said plates has a central opening therein, and which additionally includes a pair of insulated wires, one wire of said pair extending through said opening in said one plate, and said wires having their ends secured to respective ones of said plates in conductive engagement therewith.

12. A chandlier as claimed in claim 10 wherein each of said arm assemblies has a vertically bifurcated inner end, the lower end portion thereof abutting the corresponding window, and the upper end portion having hook means formed thereon; and which additionally includes an upper body member disposed vertically above said cup-shaped member and adapted for pivotally supporting said hook means.

13. A chandelier as claimed in claim 10 wherein said circular spacer and circular plates are spaced inwardly from said side wall of said body member so as to provide therebetween an annular space for receiving the insulating base of each of said arm assemblies.

14. A chandelier as claimed in claim 10 wherein the configurations of said circular spacer and said circular plates are such as to provide, near the curved circumferential edges of said plates, an axial gap for receiving each of said metal prongs.

15. In a chandelier, the combination comprising:

a generally cup-shaped plastic body having a circumferential wall;

a plastic lid removably covering said body, said body and lid together forming a plurality of circumferentially spaced non-circular windows;

a pair of generally flat, circular metal plates horizontally disposed within said body in alignment with said windows;

insulating means supporting said plates in vertically spaced relationship;

at least one arm assembly including a substantially rigid plastic arm housing having an insulating base of non-circular cross-sectional configuration formed on its inner end, and a parallel pair of flat metal prongs projecting from said base, said base extending through one of said windows in interfitting relationship therewith and said prongs being inserted between said plates in a substantially radial arrangement relative thereto and being held in spaced relationship by said insulating means, a substantial length of each prong being in face-to-face engagement with the associated plate; and locking means cooperatively formed by said insulating base, and by said body and lid adjacent to said window, for releasably retaining said assembly, said locking means being operable in response to the slidable insertion of said insulating base into the corresponding window.

16. A chandelier as claimed in claim 15 wherein one of said plates has a central opening therein, and which further includes a pair of insulated wires, one wire of said pair extending through said opening in said one plate, and said wires having their ends secured to respective ones of said plates in conductive engagement therewith.

17. A chandelier as in claim 15 wherein said insulating means includes a flat circular spacer disposed between said plates.

18. A chandelier as claimed in claim 17 wherein the configurations of said plates and said spacer are such as to provide vertical gaps therebetween for receiving corresponding ones of said metal prongs.

19. A chandelier as claimed in claim 15 wherein the outer circumference of said plates is spaced circumferentially inwardly from said body wall, so as to provide therebetween an annular space for receiving the insulating base portions of a plurality of arm assemblies.

20. A modular chandelier of the spindle and arm type, comprising:

a chandelier central body which has generally the form of a hollow cylinder whose longitudinal axis is normally vertically disposed, said central body being made of plastic material and having a plurality of circumferentially arranged windows therein;

a unitary electrical distributor within said central body providing a separate female electrical receptacle on the interior side of each of said windows, said distributor including a parallel pair of generally flat circular metal contact plates which are horizontally disposed within said body in alignment with said windows, and insulating means disposed between said plates for supporting same in vertically spaced relationship;

a plurality of chandelier arm assemblies, each adapted to extend radially outwardly from said central body in a generally horizontal direction;

each of said arm assemblies including a substantially rigid plastic arm housing whose inner end abuts said central body adjacent one of said windows, an insulating base which projects horizontally inwardly from said housing inner end and extends within the associated window, and a parallel pair of horizontally disposed, vertically spaced, flat metal prongs projecting horizontally inwardly from said base, said prongs extending between said plates with a substantial length of each prong being in face-to-face engagement with the inner surface of the associated plate; and separate mechanical latch means cooperatively formed by said central body and the insulating base of each associated arm assembly for releasably retaining the inner end of said arm assembly in cantilever-supported relationship to said central body.

21. A chandelier as in claim 20 wherein a vertically extending protrusion is formed on one of said central body and base, and a corresponding vertically extending recess is formed on the other thereof.

22. A chandelier as in claim 21 including two such protrusion-and-recess pairs for each arm.

23. A chandelier as in claim 21 wherein said vertically extending protrusion is provided by a lock member associated with all of said windows, said lock member being vertically movable relative to the remainder of said central body for seating in place after said arm assemblies have been horizontally inserted.

24. A chandelier as claimed in claim 20 wherein said body has circular top and bottom walls, and wherein said latch means includes a circumferential groove formed in the interior surface of one of said top and bottom walls.

25. In a modular chandelier, a substantially hollow distributor housing having top and bottom walls and a side peripheral wall, and being adapted to receive therein an annularly disposed electrical distributor, and to releasably retain the inner ends of a plurality of rigid radially extending chandelier arms while also providing cantilever support for said arms, said housing comprising:

a generally cup-shaped body member integrally formed of plastic material to provide said side wall and one of said top and bottom walls, and having a plurality of circumferentially spaced rectangular windows formed in said side wall;

a generally flat lid member integrally formed of plastic material to provide the other of said top and bottom walls;

means for releasably fastening said lid member to said body member;

means cooperatively provided by said two members for locking the distributor in a fixed position therein;

one of said members having a central opening therein whereby a pair of insulated conductors may enter axially into said housing for energizing the distributor; and latching means provided in at least one of said top and bottom walls radially adjacent each of said windows for releasably retaining an arm end that is radially inserted into the corresponding window for the purpose of a plug-in connection to the distributor.

26. A distributor as in claim 25 which has a hollow cylindrical configuration.

27. A distributor as in claim 25 wherein one vertical end of all of said windows is open, until closed by attachment of said lid to said body.

28. A distributor as in claim 25 wherein said latching means includes a vertical depression in the top or bottom wall adjacent each window.

29. A distributor as in claim 25 wherein said latching means includes vertically projecting means adjacent each window.

30. A distributor as in claim 25 wherein said latching means is provided in both said top wall and said bottom wall, adjacent each window.

31. A modular chandelier of the spindle and arm type, comprising:

a substantially hollow cylindrical distributor housing which includes a generally cup-shaped body member integrally formed of plastic material, and a generally flat circular lid member integrally formed of plastic materials and covering the otherwise open end of said body member, said body member having a circumferentially extending side wall in which a plurality of circumferentially spaced rectangular windows are formed;

an electrical distributor including a generally flat circular insulating spacer disposed within said body member and aligned with said windows, and a pair of generally flat circular metallic plates disposed in parallel relationship upon the upper and lower sides, respectively, of said spacer the circumferential edges of said plates being radially curved away from said spacer;

means provided within said distributor housing for locking said distributor in a fixed position therein;

said insulating spacer having a central opening therein, at least one of said metallic plates having a central opening therein, and at least one of said housing members having a central opening therein, all of said openings being aligned;

a pair of insulated conductors extending through said aligned openings, the ends of said conductors being secured to respective ones of said metallic plates in electrically conductive engagement therewith;

means for rigidly supporting said distributor housing;

a plurality of plug-in chandelier arms detachably secured to said distributor housing and extending outwardly therefrom in a generally radial horizontal direction, each of said arms including a relatively rigid arm housing whose inner end abuts the exterior wall surface of said body member adjacent to one of said windows, an insulating base rigidly supported from said arm housing and which is of rectangular cross-sectional configuration and which extends from the inner end of said arm housing into and through said one window in interfitting relationship therewith, and a parallel pair of horizontally disposed flat metal prongs projecting from said insulating base, each of said metal prongs having a substantial part of its length in face-to-face engagement with the inner surface of a corresponding one of said metallic plates;

latching means associated with each of said windows for releasably retaining therein the insulating base of the corresponding chandelier arm; and cooperating latching means formed on each said insulating base.

32. A modular chandelier with plug-in arms, comprising:

a chandelier central body having a vertical axis;

a distributor disposed within said body, including a pair of generally circular contact plates each circumdisposed about said axis, each of said contact plates having points of initial contact forming the locus of a circle and also having a contact surface extending linearly from said initial contact points, said two contact surfaces being disposed in parallel relationship;

a plurality of detachable arms, each having a rigidly extending male plug which includes an insulating base and a parallel pair of flat metallic prongs projecting therefrom;

said chandelier being of the basket type with each of said chandelier arms having a vertically bifurcated inner end, said male plug being on the lower portion of the arm inner end, and the upper portion of the arm inner end having hook means formed thereon;

said contact plates being essentially flat and being horizontally disposed, each of said male plugs extending essentially horizontally inwardly from its associated chandelier arm;

whereby when said arms are attached to said central body the prongs of each of said plugs initially contact a pair of initial contact points on respective ones of said contact plates, and then slidingly engage the respective contact surfaces thereof; and means continuously pressing each contact plate against the flat surfaces of the associated plug prongs.

33. A chandelier comprising:

a rigid central frame;

a detachable chandelier arm having a vertically bifurcated inner end;

means for attaching said arm to said frame both mechanically and electrically at the same time, including a downwardly extending hook carried by the upper inner end portion of said arm, and a horizontally extending electrical connector rigidly affixed to the lower inner end portion of said arm; and said frame having upper support means adapted for pivotal attachment of said hook thereto, lower support means adapted for horizontal insertion of said connector therein, and a mating electrical connector associated with said lower support means;

said hook first being secured to said upper support means, and said arm then being pivoted downwardly so as to attach said first-named connector to said mating connector in a horizontal sliding movement.

34. A chandelier comprising:

a detachable chandelier arm having a vertically bifurcated inner end, the lower inner end of said arm carrying a downward extending hook and the upper inner end of said arm carrying an upwardly extending hook;

a rigid central chandelier frame having upper and lower supports, said lower support having an upwardly opening socket for receiving said lower hook of said arm, and said upper support having a downwardly opening socket for receiving said upper hook of said arm;

the upper and lower inner end portions of said arm being resiliently compressible together for insertion within said chandelier frame so that said hooks may then be seated in corresponding ones of said sockets; and one of said hooks having an electrical connector carried thereby, and the associated socket having a mating electrical connector adapted to slidably receive said first-named connector, whereby said arm may be attached to said frame both mechanically and electrically at the same time.

35. In an easily assembled or disassembled electrical fixture, the combination comprising:

a generally cylindrical housing adapted to have its longitudinal axis disposed vertically, and having a plurality of circumferentially spaced windows formed therein;

a vertically disposed rigid conduit attached to one end of said housing;

a unitary female electrical receptacle structure disposed within said housing including a pair of generally flat circular contact plates each circumdisposed about said axis, each of said contact plates having points of initial contact forming the locus of a circle and also having a contact surface extending linearly from said initial contact points, said two contact surfaces being disposed in parallel relationship;

said contact plates providing a pair of electrical contacts opposite each of said windows;

at least one of said contact plates having a central opening therein; and electrical circuit means extending within said rigid conduit and hence into the interior of said housing, including a pair of insulated wires, one of said wires being connected to said one plate for energizing the same, and the other of said wires extending through said central opening and being connected to the other of said plates.

36. In a modular chandelier having plug-in arms, the combination comprising:

a plastic chandelier body of a generally hollow cylindrical configuration and having a substantially vertical exterior wall with a rectangular window formed therein;

a pair of metal plates of generally flat circular configuration and being horizontally disposed in vertically separated parallel relationship within said body adjacent said window, the outer circumferential edges of said plates being radially curved outward;

insulating means cooperating with said body for supporting said plates; and at least one detachable arm assembly including a relatively rigid arm housing having its inner end abutting said chandelier body exterior wall adjacent said window, an insulating base of rectangular cross-sectional configuration rigidly supported from said arm housing inner end and extending into and through said window in interfitting relationship therein, and a parallel pair of flat metal prongs projecting from said insulating base and having a substantial part of their length in face-to-face engagement with the inner surfaces of respective ones of said plates.

37. In a modular chandelier of the type having a chandelier central body with a circumferential wall, a plurality of circumferentially spaced windows formed in said wall, a generally flat circular insulating spacer disposed within said chandelier body in alignment with said windows, upper and lower current distributing conductors disposed respectively above and below said insulating spacer and each being arranged to extend around substantially the entire circumference of said spacer and in front of each of said windows, means cooperating with said central body to support said spacer and said conductors therein, a plurality of rigid chandelier arm assemblies extending radially outwardly from said central chandelier body with each having its inner end extending within a corresponding one of said windows, and a male electrical plug carried on the inner end of each of said chandelier arms and conductively engaging said current distributing conductors, the improvement comprising:

each of said windows being of non-circular configuration, and each said male plug including an insulating base having a non-circular cross-sectional configuration which interfits with that of the corresponding window;

each of said arm inner ends having a shoulder which extends laterally from the associated insulating base, said shoulder engaging the exterior surface of the circumferential wall of said central body;

each of said current distributing conductors being in the form of a generally flat circular metallic plate whose outer edge portion is radially curved away from said insulating spacer and from the other plate;

each of said male plugs including a pair of flat metallic prongs which extend from the associated insulating base radially into said central body in face-to-face engagement with the inner surfaces of corresponding ones of said plates; and said lateral shoulder on said arm inner end limiting the distance by which the associated metal prongs are inserted within said plates.

38. In a modular chandelier having plug-in arms, the combination comprising:

a chandelier body of generally cylindrical configuration having a substantially vertical exterior wall with a plurality of circumferentially spaced non-circular windows formed therein;

a generally flat circular insulating spacer disposed within said body and aligned with said windows;

a pair of generally flat circular metal plates disposed upon the upper and lower sides, respectively, of said spacer;

means cooperating with said body for supporting said spacer and said plates therein;

at least one detachable arm assembly including a relatively rigid arm housing having its inner end abutting said chandelier body exterior wall adjacent a corresponding window, an insulating base of non-circular cross-sectional configuration rigidly supported from said housing inner end and extending into and through said window in interfitting relationship therein, and a pair of electrical contacts carried by said insulating base and conductively engaging respective ones of said plates;

said insulating base being slidably inserted within said window, and said window inhibiting rotatable movement of said arm assembly; and mechanical latch means cooperatively formed by said body and said insulating base and responsive to the insertion of said base within said corresponding window for locking said arm assembly in place.

39. A readily detachable chandelier arm assembly, comprising:

an elongated arm having inner and outer ends;

lamp supporting means carried by the outer end of said arm;

a rigid insulating base carried out by the inner end of said arm, and projecting horizontally therefrom when said lamp supporting means is upright, said rigid insulating base being of rectangular cross-sectional configuration;

a shoulder formed at the inner end of said arm, projecting laterally from said insulating base, for limiting the extent to which said insulating base may be horizontally inserted into a rectangular window of a chandelier body;

a pair of electrical contacts carried on the inner end of said insulating base for conductively engaging corresponding distributor conductors in the chandelier central body;

circuit means within said arm interconnecting said lamp supporting means with said pair of electrical contacts; and mechanical latch means projecting laterally from said insulating base for cooperating with additional latch means within the chandelier central body in order to releasably secure the arm assembly thereto.

40. In a modular chandelier having plug-in arms, the combination comprising:

a chandelier body of generally cylindrical configuration having a substantially vertical exterior wall with a plurality of circumferentially spaced non-circular windows formed therein;

a pair of generally flat circular metal plates horizontally disposed in vertically separated parallel relationship within said body opposite said windows;

insulating means including a flat circular insulating spacer disposed between said plates and cooperating with said body for supporting said plates;

at least one detachable arm assembly including a relatively rigid arm housing having its inner end abutting said chandelier body exterior wall adjacent a corresponding window, an insulating base of non-circular cross-sectional configuration rigidly supported from said arm housing inner end and extending into and through said window in interfitting relationship therein, and a parallel pair of flat metal prongs projecting from said insulating base and having a substantial part of their length in face-to-face engagement with the surfaces of respective ones of said plates;

said insulating base and metal prongs being slidably inserted within said window, said arm housing end limiting the extent of such insertion, and said window inhibiting rotatable movement of said arm assembly; and the edges of said plates being radially outwardly curved, and said metal prongs being inserted between said plates.

41. In a modular chandelier having plug-in arms, the combination comprising:

a chandelier body of generally cylindrical configuration having a substantially vertical exterior wall with a plurality of circumferentially spaced noncircular windows formed therein;

a pair of generally flat circular metal plates horizontally disposed in vertically separated parallel relationship within said body opposite said windows, at least one of said plates having a central opening therein;

insulating means cooperating with said body for supporting said plates;

an insulating wire extending through said opening and connected to the other plate; and at least one detachable arm assembly including a relatively rigid arm housing having its inner end abutting said chandelier body exterior wall adjacent a corresponding window, an insulating base of non-circular cross-sectional configuration rigidly supported from said arm housing inner end and extending into and through said window in interfitting relationship therein, and a parallel pair of metal prongs projecting from said insulating base and having a substantial part of their length in face-to-face engagement with the surfaces of respective ones of said plates;

said insulating base and metal prongs being slidably inserted within said window, said arm housing end limiting the extent of such insertion, and said window inhibiting rotatable movement of said arm assembly.

42. In a modular lighting fixture having plug-in arms, the combination comprising:

a chandelier body of a generally hollow configuration and having a substantially vertical exterior wall with at least one rectangular window formed therein;

a pair of metal plates of generally flat configuration and being horizontally disposed in vertically separated parallel relationship within said body adjacent said window, the outer edges of said plates being radially curved outward;

insulating means cooperating with said body for supporting said plates;

at least one detachable arm assembly including a relatively rigid arm housing having its inner end abutting said chandelier body exterior wall adjacent said window, an insulating base of rectangular cross-sectional configuration rigidly supported from said arm housing inner end and extending into and through said window in interfitting relationship therein, and a parallel pair of flat metal prongs projecting from said insulating base and having a substantial part of their length in face-to-face engagement with the inner surfaces of respective ones of said plates;

mechanical latch means projecting laterally from said insulating base; and additional latch means within said chandelier body and cooperating with said first-named mechanical latch means for releasably securing said arm assembly to said body.

43. In a modular lighting fixture having plug-in arms, the combination comprising:

a fixture body having a substantially vertical exterior wall with a plurality of circumferentially spaced noncircular windows formed therein;

a generally flat insulating spacer disposed within said body and aligned with said windows;

a pair of generally flat metal plates disposed upon the upper and lower sides, respectively, of said spacer;

means cooperating with said body for supporting said spacer and said plates therein;

at least one detachable arm assembly including a relatively rigid arm housing having its inner end abutting said fixture body exterior wall adjacent a corresponding window, an insulating base of noncircular cross-sectional configuration rigidly supported from said housing inner end and extending into and through said window in interfitting relationship therein, and a pair of electrical contacts carried by said insulating base and conductively engaging respective ones of said plates;

said insulating base being slidably inserted within said window, and said window inhibiting rotatable movement of said arm assembly; and mechanical latch means cooperatively formed by said body and said insulating base and responsive to the insertion of said base within said corresponding window for locking said arm assembly in place.

44. A readily detachable chandelier arm assembly, comprising:

an elongated arm having inner and outer ends;

lamp supporting means carried by the outer end of said arm;

a rigid insulating base carried by the inner end of said arm, and projecting horizontally therefrom when said lamp supporting means is upright, said rigid insulating base being of non-circular cross-sectional configuration;

a shoulder formed at the inner end of said arm, projecting laterally from said insulating base, for limiting the extent to which said insulating base may be horizontally inserted into a correspondingly non-circular window of a chandelier body;

a parallel pair of flat metal prongs projecting from the inner end of said insulating base for conductively engaging corresponding horizontally disposed distributor plates in the chandelier central body;

circuit means within said arm interconnecting said lamp supporting means with said pair of metal prongs; and mechanical latch means projecting laterally from said insulating base for cooperating with additional latch means within the chandelier central body in order to releasably secure the arm assembly thereto.

45. The arm assembly of claim 44 which includes protrusions formed on both the upper and lower surfaces of said insulating base.

46. The arm assembly of claim 44 which includes means forming transverse grooves on both the upper and lower surfaces of said insulating base.

47. The arm assembly of claim 44 which includes upper and lower spring clips carried on the upper and lower surfaces, respectively, of said insulating base.

* * * * *